United States Patent
Elshafie et al.

(10) Patent No.: US 12,200,703 B2
(45) Date of Patent: Jan. 14, 2025

(54) FEEDBACK CHANNEL DESIGN FOR SIDELINK FEEDBACK

(71) Applicant: QUALCOMM Incorporated, San Diego, CA (US)

(72) Inventors: Ahmed Elshafie, San Diego, CA (US); Seyedkianoush Hosseini, San Diego, CA (US); Wei Yang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 422 days.

(21) Appl. No.: 17/565,170

(22) Filed: Dec. 29, 2021

(65) Prior Publication Data

US 2023/0209548 A1   Jun. 29, 2023

(51) Int. Cl.
*H04W 72/20* (2023.01)

(52) U.S. Cl.
CPC ................... *H04W 72/20* (2023.01)

(58) Field of Classification Search
CPC ..... H04W 72/20; H04W 72/25; H04W 72/40; H04L 1/0026; H04L 1/0031; H04L 1/08
See application file for complete search history.

(56) References Cited

U.S. PATENT DOCUMENTS

| | | | |
|---|---|---|---|
| 11,622,342 B2* | 4/2023 | Yang | H04L 1/1858 370/329 |
| 2020/0112400 A1* | 4/2020 | Lee | H04L 1/1819 |
| 2020/0260231 A1* | 8/2020 | Ganesan | H04W 16/28 |
| 2020/0266857 A1* | 8/2020 | Hwang | H04W 72/23 |
| 2020/0412508 A1* | 12/2020 | Wu | H04L 1/1854 |
| 2021/0022127 A1* | 1/2021 | Xu | H04W 72/20 |
| 2022/0124726 A1* | 4/2022 | Zhao | H04W 72/02 |
| 2024/0097827 A1* | 3/2024 | Lee | H04W 4/08 |

* cited by examiner

*Primary Examiner* — Afshawn M Towfighi
(74) *Attorney, Agent, or Firm* — Holland & Hart LLP

(57) ABSTRACT

Methods, systems, and devices for wireless communications are described. A transmitting user equipment (UE) or a receiving UE may receive a message indicating a set of formats for a sidelink feedback channel. The transmitting UE may transmit a sidelink control message and a sidelink data message to the receiving UE, and the receiving UE may generate feedback for the sidelink data message. The receiving UE may transmit, to the transmitting UE, a sidelink feedback message including the feedback using a set of resources of the sidelink feedback channel based on a format of the set of formats. The format may correspond to a time domain configuration, a frequency domain configuration, or both, that indicates the set of resources. In some examples, the receiving UE may receive (e.g., from the base station or the transmitting UE an indication of a format to use for the feedback message.

30 Claims, 12 Drawing Sheets

FEEDBACK CHANNEL DESIGN FOR SIDELINK FEEDBACK

FIELD OF TECHNOLOGY

The present disclosure relates to wireless communications, including feedback channel design for sidelink feedback.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a base station may configure UEs for sidelink transmission. The base station may configure time and frequency resources for the UEs to perform the sidelink transmission. In some cases, UEs that receive sidelink communications may provide feedback to a transmitting UE, which may indicate whether the receiving UE successfully decoded a transmission, may include channel state information (CSI) feedback, and the like.

SUMMARY

The described techniques relate to improved methods, systems, devices, and apparatuses that support feedback channel design for sidelink feedback. Generally, the described techniques provide configuration of resource formats for sidelink feedback messages, which may be transmitted over a sidelink feedback channel (e.g., a physical sidelink feedback channel (PSFCH). User equipment (UEs) communicating via sidelink may receive (e.g., from a base station) an indication of a set of formats for a sidelink feedback channel. A transmitting UE may transmit a sidelink control message and a sidelink data message to a receiving UE, and the receiving UE may generate feedback for the sidelink data message. The receiving UE may transmit, to the transmitting UE, a sidelink feedback message including the feedback using a set of resources of the sidelink feedback channel based on a format of the set of formats. In some examples, the receiving UE may receive (e.g., from the base station or the transmitting UE) an indication of a format to use for the feedback message.

The set of formats may be associated with a resource pool configured for the sidelink feedback channel, and each format of the set of formats may be associated with a respective set of resources. In some cases, each set of resources may correspond to an identifier, a priority (e.g., of the sidelink feedback message), a quality of service associated with the sidelink feedback message, a payload size, or a combination thereof. In some examples, each format may correspond to a resource configuration (e.g., a time domain resource configuration, a frequency domain resource configuration, or both) that indicates a starting resource and a quantity of resources of the resource pool. Additionally, or alternatively, the resource pool may be associated with one or more cover codes, one or more cell-specific sequences, a set of repetition factors, a frequency hopping pattern, a resource block allocation, or the like, among other examples.

A method for wireless communications at a first UE is described. The method may include receiving, from a base station, a message indicating a set of formats for a sidelink feedback channel for sidelink feedback associated with the first UE and a second UE, transmitting, to the second UE, a sidelink control message indicating scheduling information for a sidelink message for the second UE, transmitting the sidelink message to the second UE based on the scheduling information, and monitoring a set of resources associated with the sidelink feedback channel for a sidelink feedback message from the second UE, the set of resources based on a format of the set of formats for the sidelink feedback channel.

An apparatus for wireless communications at a first UE is described. The apparatus may include a processor, memory coupled with the processor, and instructions stored in the memory. The instructions may be executable by the processor to cause the apparatus to receive, from a base station, a message indicating a set of formats for a sidelink feedback channel for sidelink feedback associated with the first UE and a second UE, transmit, to the second UE, a sidelink control message indicating scheduling information for a sidelink message for the second UE, transmit the sidelink message to the second UE based on the scheduling information, and monitor a set of resources associated with the sidelink feedback channel for a sidelink feedback message from the second UE, the set of resources based on a format of the set of formats for the sidelink feedback channel.

Another apparatus for wireless communications at a first UE is described. The apparatus may include means for receiving, from a base station, a message indicating a set of formats for a sidelink feedback channel for sidelink feedback associated with the first UE and a second UE, means for transmitting, to the second UE, a sidelink control message indicating scheduling information for a sidelink message for the second UE, means for transmitting the sidelink message to the second UE based on the scheduling information, and means for monitoring a set of resources associated with the sidelink feedback channel for a sidelink feedback message from the second UE, the set of resources based on a format of the set of formats for the sidelink feedback channel.

A non-transitory computer-readable medium storing code for wireless communications at a first UE is described. The code may include instructions executable by a processor to receive, from a base station, a message indicating a set of formats for a sidelink feedback channel for sidelink feedback associated with the first UE and a second UE, transmit, to the second UE, a sidelink control message indicating scheduling information for a sidelink message for the second UE, transmit the sidelink message to the second UE based on the scheduling information, and monitor a set of resources associated with the sidelink feedback channel for a sidelink feedback message from the second UE, the set of resources based on a format of the set of formats for the sidelink feedback channel.

Some examples of the method, apparatuses, and non-transitory computer-readable medium described herein may further include operations, features, means, or instructions for selecting the format from the set of formats, where the set of resources corresponds to the format and the set of formats corresponds to a resource pool that includes the set of resources.

Some examples of the method, apparatuses, and non-transitory computer-readable medium described herein may further include operations, features, means, or instructions for transmitting an indication of the format in the sidelink control message based on the scheduling information for the sidelink message, where the scheduling information indicates a number of time resources for the sidelink message.

Some examples of the method, apparatuses, and non-transitory computer-readable medium described herein may further include operations, features, means, or instructions for transmitting an indication of the format in the sidelink control message based on a channel state information (CSI) trigger associated with the first UE.

Some examples of the method, apparatuses, and non-transitory computer-readable medium described herein may further include operations, features, means, or instructions for transmitting an indication of the format in the sidelink control message, where the sidelink control message includes one of a sidelink control information (SCI) message, a PC5 message, a radio resource control (RRC) message, or a medium access control element (MAC-CE).

Some examples of the method, apparatuses, and non-transitory computer-readable medium described herein may further include operations, features, means, or instructions for receiving an indication of the format from the base station, where the format may be for both the first UE and the second UE.

In some examples of the method, apparatuses, and non-transitory computer-readable medium described herein, receiving the message indicating the set of formats may include operations, features, means, or instructions for receiving an indication of a time domain configuration, a frequency domain configuration, or both corresponding to the format, where the time domain configuration, the frequency domain configuration, or both indicate the set of resources.

In some examples of the method, apparatuses, and non-transitory computer-readable medium described herein, the format of the set of formats corresponds to one or more sets of resources for the sidelink feedback channel, each of the one or more sets of resources corresponding to a respective resource identifier.

In some examples of the method, apparatuses, and non-transitory computer-readable medium described herein, each respective resource identifier may be associated with a respective payload size for feedback, a respective priority, a respective quality of service, or a combination thereof.

Some examples of the method, apparatuses, and non-transitory computer-readable medium described herein may further include operations, features, means, or instructions for selecting the set of resources based on an identifier associated with the first UE, an identifier associated with the second UE, or a combination thereof.

Some examples of the method, apparatuses, and non-transitory computer-readable medium described herein may further include operations, features, means, or instructions for receiving, from the base station, an indication of a cover code and a cell-specific sequence for the first UE, where the cover code and the cell-specific sequence may be associated with a resource pool that includes the set of resources.

Some examples of the method, apparatuses, and non-transitory computer-readable medium described herein may further include operations, features, means, or instructions for receiving, from the base station, an indication of a set of multiple cover codes and a set of multiple cell-specific sequences for the first UE, where the set of multiple cover codes and the set of multiple cell-specific sequences may be associated with a resource pool that includes the set of resources, selecting a cover code from the set of multiple cover codes and a cell-specific sequence from the set of multiple cell-specific sequences, and transmitting, to the second UE, the cover code and the cell-specific sequence in a control message, where the control message includes one of a sidelink control message, a PC5 message, an RRC message, a MAC-CE.

Some examples of the method, apparatuses, and non-transitory computer-readable medium described herein may further include operations, features, means, or instructions for selecting a cover code based on a slot index, a mini-slot index, a number of symbols of the sidelink message, an identifier of the first UE, an identifier of the second UE, or any combination thereof.

Some examples of the method, apparatuses, and non-transitory computer-readable medium described herein may further include operations, features, means, or instructions for selecting a repetition factor of a set of repetition factors associated with a resource pool that includes the set of resources based on CSI associated with the second UE, a number of time resources associated with the sidelink message, a payload size associated with the feedback message, or any combination thereof and transmitting the repetition factor to the second UE in the sidelink control message.

In some examples of the method, apparatuses, and non-transitory computer-readable medium described herein, the monitoring may include operations, features, means, or instructions for receiving one or more instances of the sidelink feedback message from the second UE based on the repetition factor.

In some examples of the method, apparatuses, and non-transitory computer-readable medium described herein, receiving the one or more instances of the sidelink feedback message may include operations, features, means, or instructions for receiving a first instance of the sidelink feedback message and a second instance of the sidelink feedback message based on a frequency hopping pattern associated with the resource pool.

Some examples of the method, apparatuses, and non-transitory computer-readable medium described herein may further include operations, features, means, or instructions for selecting the frequency hopping pattern from a set of frequency hopping patterns for the resource pool and transmitting the frequency hopping pattern to the second UE in the sidelink control message, where the sidelink control message includes an SCI message, a PC5 message, an RRC message, a MAC-CE, or any combination thereof.

Some examples of the method, apparatuses, and non-transitory computer-readable medium described herein may further include operations, features, means, or instructions for selecting the set of resources based on a resource block allocation associated with a resource pool that includes the set of resources.

Some examples of the method, apparatuses, and non-transitory computer-readable medium described herein may further include operations, features, means, or instructions for selecting a bundle size for the sidelink feedback message based on the resource block allocation or the set of resources.

Some examples of the method, apparatuses, and non-transitory computer-readable medium described herein may further include operations, features, means, or instructions for transmitting an indication of the bundle size in the sidelink control message.

A method for wireless communications at a second UE is described. The method may include receiving, from a base station, a message indicating a set of formats for a sidelink feedback channel for sidelink feedback associated with a first UE and the second UE, receiving, from the first UE, a sidelink control message indicating scheduling information for a sidelink message for the second UE, receiving the sidelink message from the first UE based on the scheduling information, and transmitting, to the first UE, a sidelink feedback message using a set of resources associated with the sidelink feedback channel, the set of resources based on a format of the set of formats for the sidelink feedback channel.

An apparatus for wireless communications at a second UE is described. The apparatus may include a processor, memory coupled with the processor, and instructions stored in the memory. The instructions may be executable by the processor to cause the apparatus to receive, from a base station, a message indicating a set of formats for a sidelink feedback channel for sidelink feedback associated with a first UE and the second UE, receive, from the first UE, a sidelink control message indicating scheduling information for a sidelink message for the second UE, receive the sidelink message from the first UE based on the scheduling information, and transmit, to the first UE, a sidelink feedback message using a set of resources associated with the sidelink feedback channel, the set of resources based on a format of the set of formats for the sidelink feedback channel.

Another apparatus for wireless communications at a second UE is described. The apparatus may include means for receiving, from a base station, a message indicating a set of formats for a sidelink feedback channel for sidelink feedback associated with a first UE and the second UE, means for receiving, from the first UE, a sidelink control message indicating scheduling information for a sidelink message for the second UE, means for receiving the sidelink message from the first UE based on the scheduling information, and means for transmitting, to the first UE, a sidelink feedback message using a set of resources associated with the sidelink feedback channel, the set of resources based on a format of the set of formats for the sidelink feedback channel.

A non-transitory computer-readable medium storing code for wireless communications at a second UE is described. The code may include instructions executable by a processor to receive, from a base station, a message indicating a set of formats for a sidelink feedback channel for sidelink feedback associated with a first UE and the second UE, receive, from the first UE, a sidelink control message indicating scheduling information for a sidelink message for the second UE, receive the sidelink message from the first UE based on the scheduling information, and transmit, to the first UE, a sidelink feedback message using a set of resources associated with the sidelink feedback channel, the set of resources based on a format of the set of formats for the sidelink feedback channel.

Some examples of the method, apparatuses, and non-transitory computer-readable medium described herein may further include operations, features, means, or instructions for selecting the format from the set of formats, where the set of resources corresponds to the format and the set of formats corresponds to a resource pool that includes the set of resources.

Some examples of the method, apparatuses, and non-transitory computer-readable medium described herein may further include operations, features, means, or instructions for receiving an indication of the format in the sidelink control message based on the scheduling information for the sidelink message, where the scheduling information indicates a number of time resources for the sidelink message.

Some examples of the method, apparatuses, and non-transitory computer-readable medium described herein may further include operations, features, means, or instructions for receiving an indication of the format in the sidelink control message based on a CSI trigger associated with the first UE.

Some examples of the method, apparatuses, and non-transitory computer-readable medium described herein may further include operations, features, means, or instructions for receiving an indication of the format in the sidelink control message, where the sidelink control message includes one of an SCI message, a PC5 message, an RRC message, or a MAC-CE.

Some examples of the method, apparatuses, and non-transitory computer-readable medium described herein may further include operations, features, means, or instructions for receiving an indication of the format from the base station, where the format may be for both the first UE and the second UE.

In some examples of the method, apparatuses, and non-transitory computer-readable medium described herein, receiving the message indicating the set of formats may include operations, features, means, or instructions for receiving an indication of a time domain configuration, a frequency domain configuration, or both corresponding to the format, where the time domain configuration, the frequency domain configuration, or both indicate the set of resources.

In some examples of the method, apparatuses, and non-transitory computer-readable medium described herein, the format of the set of formats corresponds to one or more sets of resources for the sidelink feedback channel, each of the one or more sets of resources corresponding to a respective resource identifier.

DETAILED DESCRIPTION

Figure 1:
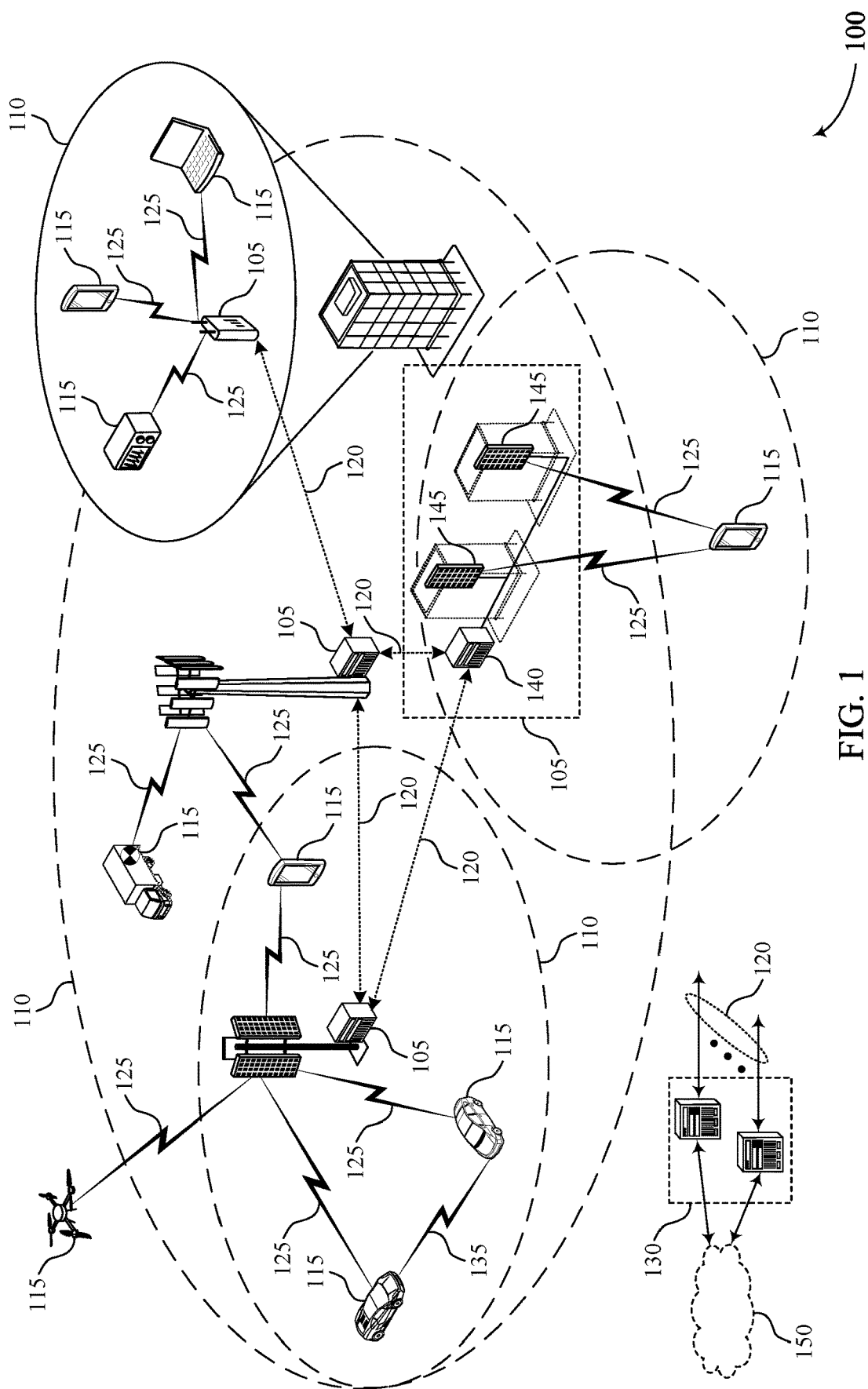
FIGS. 1 and 2 illustrate examples of wireless communications systems that support feedback channel design for sidelink feedback in accordance with aspects of the present disclosure.

A wireless communications system may support access links and sidelinks for communications between communication devices. An access link may refer to a communication link between a user equipment (UE) and a base station, and a sidelink may refer to a communication link between similar wireless devices (e.g., a communication link between UEs). For example, a transmitting UE may transmit a sidelink control channel signal (e.g., physical sidelink control channel (PSCCH)) to a receiving UE. The sidelink control channel signal may include sidelink control information (SCI) that may indicate information (e.g., time resources, frequency resources, a modulation and coding scheme (MCS)) associated with a subsequent sidelink shared channel signal (e.g., physical sidelink shared channel (PSSCH)), where the sidelink shared channel signal may include data for the receiving UE. Accordingly, the receiving UE may identify the information included in the SCI to receive and decode a subsequent PSSCH. In some cases, the PSSCH may be associated with sidelink feedback channel resources (e.g., physical sidelink feedback channel resources (PSFCH) resources) that the receiving UE may use to transmit feedback information (e.g., hybrid automatic repeat request (HARQ) acknowledgment/negative-acknowledgment (ACK/NACK) feedback) associated with the PSSCH to the transmitting UE. For example, the receiving UE may transmit a sidelink feedback message over the PSFCH including an ACK that indicates that the receiving UE successfully received and decoded the PSSCH or a NACK that indicates that the receiving UE failed to successfully receive and/or decode the PSSCH.

In some cases, sidelink communications may be configured with resource pools in which sidelink resources may be assigned at a slot level, or at a mini-slot level (e.g., a subset of symbols within a sidelink slot). Such resource pool configurations may provide for enhanced flexibility in scheduling sidelink communications. In some examples, resource pools may be configured to provide resources for a PSFCH. For instance, the receiving UE may select resources from a resource pool to use for transmitting the sidelink feedback message. However, the PSFCH may support limited resource configurations for transmission of sidelink feedback messages, which may result in relatively long latency for ACK/NACK feedback. Further, the PSFCH allows for one ACK/NACK bit for an associated feedback for the associated PSSCH transmission. In some cases, such as in ultra-reliable low-latency communications (URLLC), one bit may not be sufficient to maintain quality of service (Qos) requirements. Further, sidelink configurations may provide that channel state information (CSI) reports are transmitted via the PSFCH, which may result in relatively high latency in CSI feedback.

Various aspects as discussed herein provide techniques for conveying feedback (e.g., HARQ ACK/NACK feedback, CSI feedback, or the like) based on a set of formats associated with PSFCH resources, which may improve sidelink feedback performance by reducing latency and increasing reliability. For example, the receiving UE and the transmitting UE may receive, from a base station, an indication of a set of formats for a PSFCH. In some cases, the set of formats may correspond to a resource pool. The receiving UE may transmit the sidelink feedback message over a set of resources of the resource pool based on a format of the set of formats. For example, the receiving UE may select a format from the set of formats and may transmit the sidelink feedback message over a set of resources associated with the format. In some cases, the transmitting UE or the base station may indicate a format to the receiving UE, and the receiving UE may use the indicated format.

Each format of the set of formats may correspond to a resource configuration (e.g., a time domain resource configuration, a frequency domain resource configuration, or both). For example, a format may correspond to a quantity of symbols, a starting symbol, a quantity of resource blocks, a starting resource block, or a combination thereof, of the set of resources. Additionally, or alternatively, the resource pool may be associated with one or more cover codes, one or more cell-specific sequences, a set of repetition factors, a frequency hopping pattern, a resource block allocation, or the like, among other examples. In some cases, each format may correspond to one or more sets of resources. A set of resources may in turn, correspond to an identifier, a priority (e.g., of the sidelink feedback message), a QoS associated with the sidelink feedback message, a payload size, or a combination thereof. Accordingly, the receiving UE may use a format for the sidelink feedback message that provides sufficient performance, e.g., based on the sidelink feedback message. As an illustrative example, in URLLC communications, the receiving UE may select a format associated with a QoS that satisfies URLLC requirements.

Particular aspects of the subject matter described in this disclosure may be implemented to realize one or more of the following potential advantages. The techniques employed by the described communication devices may implement flexible feedback resource allocation for sidelink transmission. For example, operations performed by the described communication devices may provide improvements to feedback resource allocations for sidelink transmission, which may provide reduced latency for sidelink feedback. Such techniques may support improved efficiency for sidelink communications, higher data rates, and enhanced reliability, among other benefits.

Aspects of the disclosure are initially described in the context of wireless communications systems. Aspects of the disclosure are then described with reference to format configurations and a process flow. Aspects of the disclosure are further illustrated by and described with reference to apparatus diagrams, system diagrams, and flowcharts that relate to feedback channel design for sidelink feedback.

FIG. 1 illustrates an example of a wireless communications system 100 that supports feedback channel design for sidelink feedback in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (STTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

In some examples, a carrier may support multiple cells, and different cells may be configured according to different protocol types (e.g., MTC, narrow band IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrow band communications), or a combination of these techniques. For example, some UEs 115 may be configured for operation using a narrow band protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (Tresource pools). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHZ industrial, scientific, and medical (ISM) band. When operating in unlicensed radio frequency spectrum bands, devices such as the base stations 105 and the UEs 115 may employ carrier sensing for collision detection and avoidance. Devices in wireless communications system 100 may communicate over unlicensed spectrum, such as the 5 GHz band, the 2.4 GHz band, the 60 GHz band, the 3.6 GHz band, and/or the 900 MHZ band. The unlicensed spectrum may also include other frequency bands. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, HARQ feedback may be used in sidelink communications between UEs 115. For example, a transmitting UE 115 may transmit a sidelink control channel signal (e.g., PSCCH) to a receiving UE 115. The sidelink control channel signal may include or be an example of SCI that indicates scheduling information for a subsequent sidelink shared channel signal (e.g., PSSCH), where the sidelink shared channel signal may include data for the receiving UE 115. The receiving UE 115 may receive and decode a subsequent PSSCH message based on the SCI. Additionally, the receiving UE 115 may transmit feedback (e.g., HARQ feedback) for the PSSCH message to the transmitting UE 115, for instance, over a PSFCH. In some cases, the PSSCH may be associated with PSFCH resources (e.g., a resource pool) such that the receiving UE 115 may determine resources for transmitting the feedback (e.g., as part of a sidelink feedback message) based on the corresponding PSSCH. For instance, the receiving UE 115 may identify PSFCH resources based on a starting subchannel or number of subchannels of the PSSCH, a slot in which the PSSCH is transmitted, an identifier corresponding to the transmitting UE 115 (i.e., a source identifier), and an identifier corresponding to the receiving UE 115 (e.g., a destination identifier). However, the PSFCH resources may be configured such that the receiving UE 115 may only select a limited quantity of resources for the sidelink feedback message, which may, in turn, limit an amount of feedback information included in the sidelink feedback message and increase latency.

The techniques described herein support formats for sidelink feedback channels (e.g., PSFCH), such that sidelink feedback messages may be transmitted on a set of resources in accordance with a PSFCH format. For example, a base station 105 may configure a set of formats and may transmit an indication of the set of formats to the transmitting UE 115 and the receiving UE 115. In some cases, a set of formats may be configured per resource pool. Additionally, or alternatively, a resource pool, or each resource set of a resource pool, may be associated with one or more cover codes, one or more cell-specific sequences, a set of repetition factors, a frequency hopping pattern, a resource block allocation, or the like, among other examples.

In some examples, each format may correspond to a resource configuration. For example, a format may correspond to a time domain resource configuration (e.g., a starting symbol, a number of symbols), a frequency domain resource configuration (e.g., a starting resource block, a number of resource blocks), or both. Additionally, or alternatively, each format may correspond to one or more sets of resources. A set of resources may, in turn, correspond to an identifier, a priority (e.g., of the sidelink feedback message), a QOS associated with the sidelink feedback message, a payload size, or a combination thereof.

The receiving UE 115 may transmit a sidelink feedback message to the transmitting UE 115 based on a format of the set of formats. For example, if the sidelink feedback message is to include CSI feedback in addition to HARQ feedback, the receiving UE 115 may use a format associated with a sufficient payload size. To improve reliability, the receiving UE 115 may use a format associated with resources having a repetition factor, such that the receiving UE 115 transmits multiple instances of sidelink feedback message. The receiving UE 115 may transmit the sidelink feedback message over a set of resources associated with the format. In some cases, the transmitting UE 115 or the base station may 105 indicate a format to the receiving UE 115, and the receiving UE 115 may use the indicated format.

Figure 2:
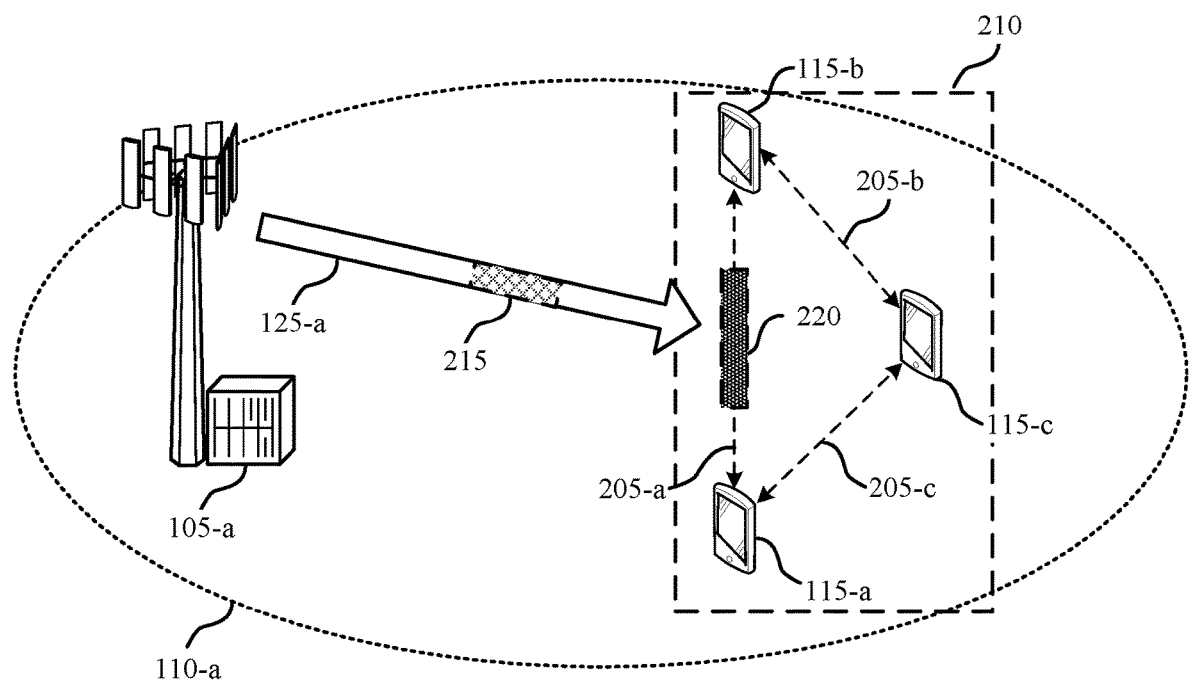

FIG. 2 illustrates an example of a wireless communications system 200 that supports feedback channel design for sidelink feedback in accordance with aspects of the present disclosure. In some examples, the wireless communications system 200 may implement aspects of wireless communications system 100. The wireless communications system 200 includes a base station 105-a, a geographic coverage area 110-a, and UEs 115, which may be examples of corresponding devices as described herein.

The wireless communications system 200 may support both access links and sidelinks for communications between one or more communication devices. An access link may refer to a communication link 125-a between UEs 115 (e.g., a first UE 115-a, a second UE 115-b, and a third UE 115-c) and the base station 105-a. A sidelink may refer to any communication link 205 between similar wireless devices (for example, a communication link between the UEs 115, or a backhaul communication link between base stations). It is noted that while various examples provided herein are discussed for UE sidelink devices, such sidelink techniques may be used for any type of wireless devices that use sidelink communications. For example, a sidelink may support one or more of D2D communications, V2X or V2V communications, industrial Internet of Things (IIoT) communications, message relaying, discovery signaling, beacon signaling, integrated access and backhaul (IAB) signaling, or other signals transmitted over-the-air from one device to one or more other like devices.

The base station 105-a may communicate with one or more UEs 115 (for example, UEs 115-a, UE 115-b, and UE 115-c), which may be included within a UE group 210. For example, the base station 105-a may transmit a signal 215 to the UE 115-a, the UE 115-b, or the UE 115-c. As depicted in the example of FIG. 2, the UE 115-a, the UE 115-b, and the UE 115-c may communicate with each other (or with another group of UEs 115) over the communication links 205 using sidelink communications (for example, using a peer-to-peer (P2P) or D2D protocol). Each UE 115 may monitor resource pools for sidelink communications or indications of sidelink communications (for example, resource reservations, control channel transmissions, among other examples) from other UEs 115 in the UE group 210. Additionally, or alternatively, the UEs 115 may have data to transmit to (or receive from) a UE 115 in the UE group 210 and may use sidelink communications to transmit the data transmission. In some examples, the UE group 210 of the UEs 115 may utilize sidelink communications in addition to access links with the base station 105-a.

In some examples, the UEs 115 may be in a coverage area 110-a of the base station 105-a. In such examples, a UE 115 may communicate with the base station 105-a via a Uu interface (for example, the base station 105-a may transmit downlink communications to the UE 115 via an access link). The base station 105-a may configure sidelink communication resources for the UE group 210 using a configuration message. For instance, the base station 105-a may communicate the signal 215 to indicate a resource allocation for the UEs 115 in the UE group 210. In some cases, one or more UEs 115 of the UE group 210 may not be inside the coverage area 110-a or may not communicate with the base station 105 a using an access link. Here, a UE 115 that is inside the coverage area 110-a and/or communicates with the base station 105 may relay information, such as the resource allocation, to the one or more UEs 115.

A UE 115 (such as, UE 115-a, UE 115-b, and UE 115-c) may have information (for example, a detection of an object or obstacle on a road in a V2X system, scheduling information, among other examples) to transmit to other UEs 115 in the UE group 210, and the UE 115 may initiate sidelink communications including the information to the other UEs 115. In such cases, the UE 115 initiating the sidelink communications may be referred to as a transmitting UE and the UE 115 receiving the sidelink communications may be referred to as a receiving UE. In the example of FIG. 2, the UE 115-a may be an example of a transmitting UE and the UEs 115-b and 115-c may be examples of receiving UEs.

For example, the UE 115-a may transmit, via sidelink communications link 205-a, a sidelink control message (e.g., PSCCH) to the UE 115-b. The sidelink control message may include SCI (e.g., first-stage SCI (SCI1)), that may indicate scheduling information (e.g., time resource, frequency resources, MCS) associated with a subsequent sidelink shared channel message (e.g., PSSCH). The UE 115-b may receive and decode a subsequent sidelink shared channel message based on the scheduling information. In some cases, the sidelink shared channel message may be associated with sidelink feedback channel resources (e.g., PSFCH resources) that the UE 115-b may use to transmit (e.g., to the UE 115-a) feedback associated with the sidelink shared channel message. For example, the UE 115-b may transmit, via sidelink communications link 205-a, a sidelink feedback message including an ACK to indicate that the UE 115-b successfully received and decoded the PSSCH or a NACK to indicate that the UE 115-b failed to successfully receive or decode the PSSCH.

The sidelink shared channel message received by a UE 115 may include SCI (e.g., second-stage SCI (SCI2)) and a data channel (e.g., a transport block). The second-state SCI may indicate one or more parameters associated with the sidelink shared channel message. In some cases, the second-stage SCI may indicate a source identifier (ID) that is associated with or otherwise indicates the UE 115 transmitting the sidelink shared channel message. Additionally, or alternatively, the second-stage SCI may indicate a destination ID that is associated with or otherwise indicates the UE 115 receiving the sidelink shared channel message.

A receiving UE 115, such as the UE 115-b, may determine resources to use for a sidelink feedback message based on the source ID, the destination ID, and one or more additional parameters. For example, the UE group 210 may be configured with a resource pool for PSFCH transmissions, such that a receiving UE 115 selects resources from the resource pool to transmit the sidelink feedback message. With L subchannels in a resource pool and N PSSCH slots associated with a slot containing a PSFCH transmission, there are M=N· L physical resources blocks (PRBs) available for PSFCH feedback (e.g., ACK/NACK feedback). Accordingly, there may be $M_{set}$=M/(N·L) feedback resources (e.g., RBs) for one subchannel and one slot. In some examples, there may be X resource blocks available per {slot index, Y}, where Y may indicate a starting subchannel or a number of subchannels. A receiving UE 115 may determine or otherwise identify a feedback resource with index i, where i=mod($P_{ID}$+$M_{ID}$, X). $P_{ID}$ may be source ID and $M_{ID}$ may be the destination ID.

For example, a number of PSFCH RBs may be equal to 80 PRBs (e.g., M=80), a number of PSSCH slots associated with one PSFCH slot, N, may be equal to four (e.g., N=4), a subchannel size may be equal to 10 PRBs, and the number of subchannels, L, may be equal to ten (e.g., L=10). Accordingly, there may be two resource blocks available per subchannel and per slot (e.g., $M_{set}$=M/(N·L)=2). Put another way, each subchannel may be associated with two PSFCH resources. The receiving UE 115 may calculate a PSFCH resource index according to i=mod($P_{ID}$+$M_{ID}$, X).

However, in some examples, PSFCH resources may be configured with a limited number of resources per PSFCH transmission, which may in turn limit information included in a sidelink feedback message. For example, the receiving UE 115 may be limited to two symbols, where a first symbol is used for automatic gain control (AGC) and a second symbol is used to transmit HARQ feedback. In such examples, the receiving UE 115 may only include a single bit (e.g., indicating ACK or NACK) in a sidelink feedback message.

The techniques described herein support formats for sidelink feedback messages that may enable larger payload sizes, improved QoS, increased reliability, and reduced latency. For example, resources associated with the PSFCH (e.g., a resource pool) may be configured (e.g., by the base station 105-a or another network node) with multiple formats, and a receiving UE 115 may transmit a sidelink feedback message using a format that provides sufficient performance, e.g., based on a type of sidelink traffic, a payload of the sidelink feedback message, QoS requirements, a transmitting UE 115, or the like, among other examples.

The base station 105-a may transmit an indication of a set of configured formats to the UEs 115 as part of the signal 215. The set of formats may be for a sidelink feedback channel (e.g., PSFCH) for the UEs 115 to use for transmitting sidelink feedback. In some cases, the base station 105-a may configure a set of formats for each resource pool associated with a sidelink feedback channel. In some examples, each resource in a resource pool may be associated with one or more resource identifiers (IDs), and each resource ID may correspond to one or more formats. To transmit a sidelink feedback message 220, a UE 115 may select a set of resources from the resource pool based on a corresponding format, or may select a format from the set of formats and determine a set of corresponding resources.

In some examples, a transmitting UE, such as the UE 115-a, may select a format for a receiving UE 115, such as the UE 115-b, to use for a sidelink feedback message 220. For example, the UE 115-a may transmit a sidelink control message that schedules a sidelink message. The UE 115-a may select a format based on the sidelink message, e.g., based on a number of mini-slots of the sidelink message, and may indicate the format in the sidelink control message. In another example, the UE 115-a may be associated with a CSI trigger. Accordingly, if CSI is triggered, the UE 115-a may select a format that enables the UE 115-b to include CSI in the sidelink feedback message 220. For example, the UE 115-a may select a format that includes enough resources for the UE 115-b to report a channel quality indicator (CQI), a rank indicator (RI), or the like, in addition to feedback for the sidelink message. The sidelink control message may be an example of SCI, a PC5 message (e.g., for V2X communications), a radio resource control (RRC) message, a medium access control control element (MAC-CE), or the like.

In some cases, the base station 105-a may indicate a format for the UE 115-a, the UE 115-b, or both, to use to transmit a sidelink feedback message 220. In some examples, the base station 105-a may indicate a format to the UE 115-a and the UE 115-a may relay an indication of the format to the UE 115-b. Alternatively, the UE 115-b may select a format. In any case, the UE 115-b may transmit the sidelink feedback message 220 over a set of resources and based on a format.

For instance, a format may indicate a set of resources (e.g., of the resource pool) having a given configuration. In some cases, a format may correspond to a quantity of resources (e.g., frequency domain resources, time domain resources, or both), a starting resource (e.g., in the frequency domain, the time domain, or both), or a combination thereof. The UE 115-b transmitting the sidelink feedback message 220 based on a format may use resources in accordance with the format. In some examples, a format may indicate a resource configuration, but may not indicate specific resources of a resource pool. For instance, the format may correspond to a set of PRBs that are consecutive in time (e.g., without frequency hopping). The UE 115-b may select any PRBs from the resource pool that are consecutive in time. Alternatively, the UE 115 may receive an indication of specific PRBs to use, for example, from another UE 115 (e.g., the UE 115-a) or from the base station 105-a.

As described in greater detail with reference to FIG. 3, a format may indicate a time domain resource configuration, such as a number of symbols, a starting symbol, or both. In such examples, the UE 115-b may identify resources in the time domain based on the format, and may identify resources in the frequency domain based on the source ID, the destination ID, and one or more additional parameters. That is, the UE 115-b may identify the frequency domain resources based on the mapping between the PSFCH and a PSSCH of the sidelink message, e.g., according to i=mod ($P_{ID}$+$M_{ID}$, X), as described herein. Alternatively, the format may additionally indicate a frequency domain resource configuration, such as a number of PRBs and a starting PRB.

In some cases, a resource pool associated with the PSFCH may include sets of resources (e.g., sets of time and frequency resources), and each set of resources may correspond to a respective resource identifier. Each resource identifier may be associated with a respective payload size, a respective priority, a respective QoS, or a combination thereof. For instance, the base station 105-a may configure different resource identifiers to support payloads of different sizes by allocating a respective quantity of bits to each resource identifier.

The UE 115-b may determine a format based on a corresponding resource identifier. For example, to transmit a sidelink feedback message 220 having a particular payload size, the UE 115-b may select a resource identifier that corresponds to the payload size. If multiple resource identifiers support the payload size, the UE 115-b may determine a resource identifier to use based on a source ID (e.g., associated with the UE 115-*a*), a destination ID (e.g., associated with the UE 115-*a*), a module number of IDs, or a combination thereof. In some cases, the UE 115-*a* may transmit an indication of the resource identifier to the UE 115-*b*.

In some examples, a resource pool may correspond to a resource allocation (e.g., a quantity of resource blocks). The UE 115-*b* may select a set of resources for the sidelink feedback message 220 based on the resource allocation. For instance, the UE 115-*b* may identify a set of PRBs based on a slot index and a starting subchannel index or a number of subchannels (e.g., PSSCH subchannels). The set of PRBs may have a cardinality X corresponding to a quantity of resource blocks available for feedback (e.g., per symbol). The UE 115-*b* may identify a starting PRB of the set of PRBs according to i=mod($P_{ID}+M_{ID}$, X). In some examples, the UE 115-*b* may additionally determine a bundle size (e.g., a quantity of resource blocks) for the set of PRBs. For instance, the set of PRBs may correspond to a bundle size, or the UE 115-*b* may receive (e.g., from the UE 115-*a*) an indication of a bundle size as part of SCI (e.g., SCI2). Alternatively, the UE 115-*b* may select a bundle size, for instance, based on the set of PRBs or the resource allocation.

Additionally, or alternatively, the resource pool, or one or more sets of resources in the resource pool, may be associated with a set of repetition factors, a set of frequency hopping patterns, or both. Transmitting the sidelink feedback message 220 with one or more repetitions or using frequency hopping may improve reliability and a likelihood that the UE 115-*a* successfully receives and decodes the sidelink feedback message 220, which may be particularly important in poor channel conditions, for URLLC traffic, or the like. As such, the UE 115-*b* may select a repetition factor (e.g., from a set of repetition factors) for transmitting the sidelink feedback message 220, where a repetition factor indicates a quantity of repetitions (i.e., instances) of the sidelink feedback message 220. Additionally, or alternatively, the UE 115-*b* may select a frequency hopping pattern (e.g., from a set of frequency hopping patterns) and may transmit the sidelink feedback message 220 in accordance with the frequency hopping pattern. For example, the UE 115-*b* may transmit a first repetition of the sidelink feedback message 220 on a first frequency resource and may transmit a second repetition of the sidelink feedback message 220 on a second frequency resource.

The UE 115-*b* or the UE 115-*a* may select a repetition factor based on CSI associated with the UE 115-*b*, such as CSI to be reported in the sidelink feedback message 220, a payload size of the sidelink feedback message 220, a number of mini-slots of the sidelink message transmitted by the UE 115-*a*, or a combination thereof. In some examples, the UE 115-*a* may select and indicate the frequency hopping pattern or the repetition factor to the UE 115-*b*. For instance, the UE 115-*a* may transmit an indication of a frequency hopping pattern, a repetition factor, or both, as part of a sidelink control message (e.g., SCI2, a PC5 message, an RRC message, a MAC-CE, or a combination thereof).

In the example of FIG. 2, each UE 115 of the UE group 210 may be configured to transmit sidelink feedback using resources from a same resource pool. In some cases, the UEs 115 may additionally use a same format, a same set of time and/or frequency resources, or both. Accordingly, to avoid collisions or interference between transmissions of the UEs 115, the base station 105-*a* may configure a set of cover codes (e.g., orthogonal cover codes (OCCs)), a set of cell-specific sequences, or both, for the UE group 210 and associated with a resource pool. In some examples, the base station 105-*a* may configure each UE 115 with a respective OCC and cell-specific sequence, e.g., may transmit an indication of a respective OCC and cell-specific sequence to each UE 115. Alternatively, the base station 105-*a* may indicate a set of OCCs and cell-specific sequences, and a transmitting UE 115 (e.g., the UE 115-*a*) may select an OCC and cell-specific sequence.

In some examples, the transmitting UE 115 may select the OCC based on a slot index, a mini-slot index, or a quantity of symbols of the sidelink message, or a combination thereof. Additionally, or alternatively, the OCC may be selected based on a source ID and a destination ID. The transmitting UE 115 may indicate the selected OCC and cell-specific sequence to a receiving UE 115 (e.g., the UE 115-*b*), for instance, via a sidelink control message (e.g., SCI2), a PC5 message, an RRC message, a MAC-CE, or a combination thereof.

Figure 3A:
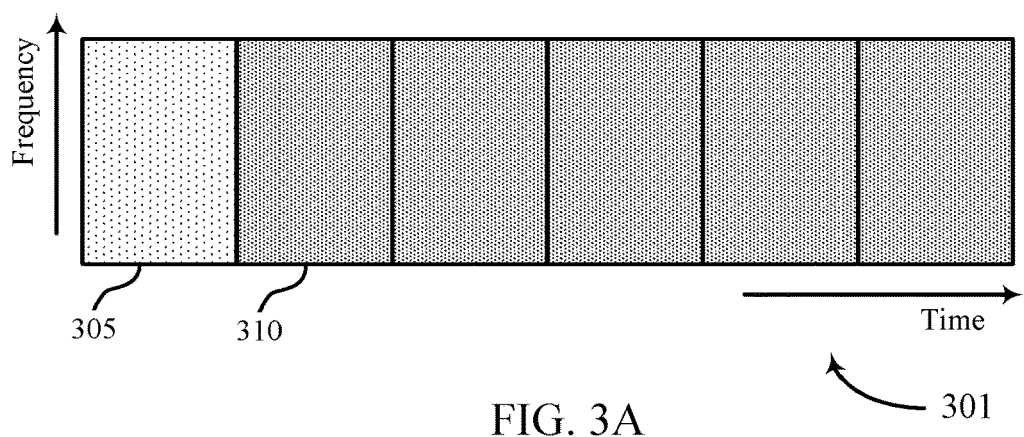
FIGS. 3A, 3B, and 3C illustrate examples of format configurations that support feedback channel design for sidelink feedback in accordance with aspects of the present disclosure.
Figure 3B:
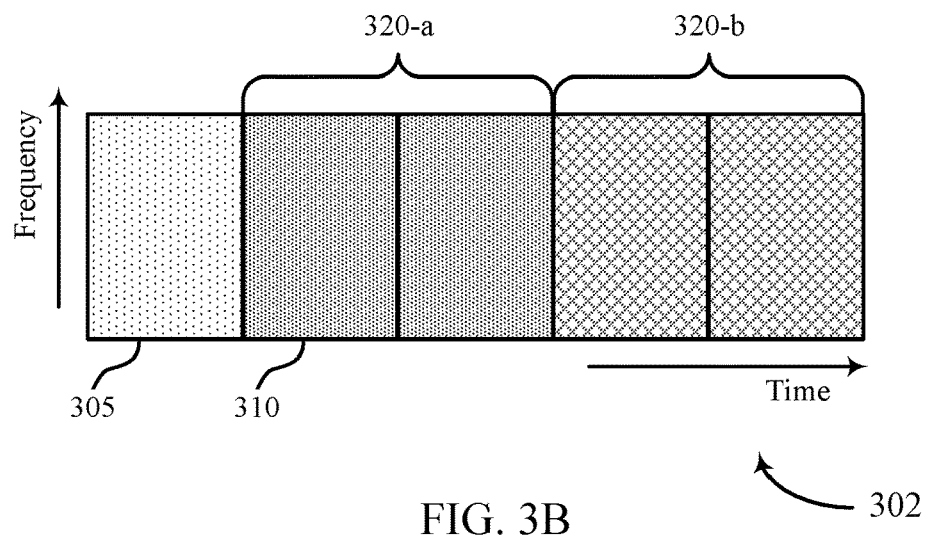
Figure 3C:
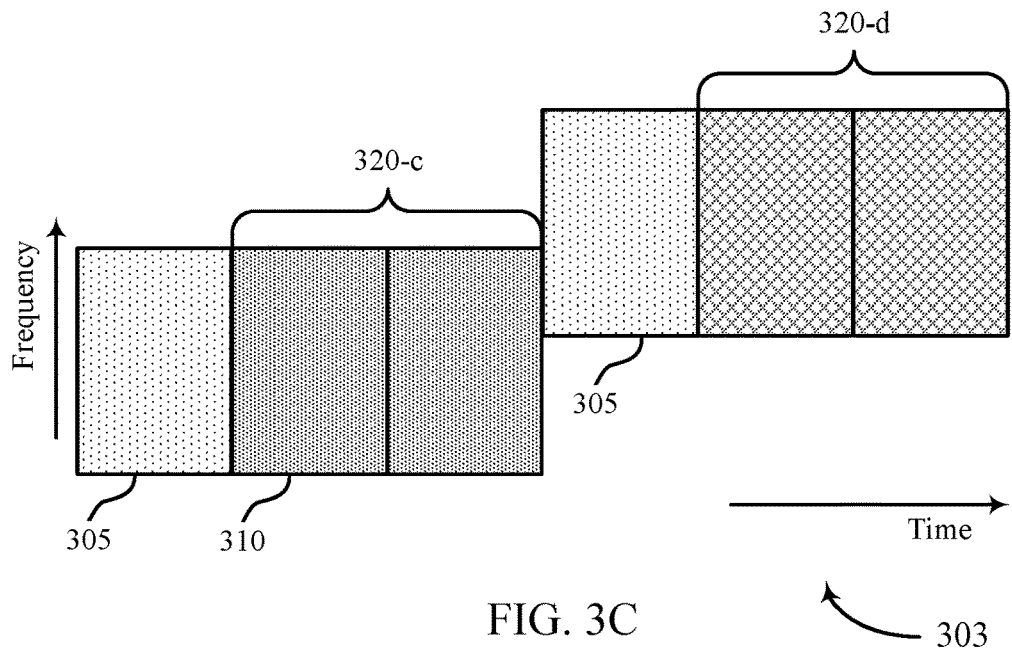

FIGS. 3A, 3B, and 3C illustrate examples of format configurations 301, 302, and 303, respectively, that support feedback channel design for sidelink feedback in accordance with aspects of the present disclosure. In some examples, the format configurations 301, 302, and 303 may support communications in aspects of wireless communications systems 100 or 200. For example, the format configurations 301, 302, and 303 illustrate example configurations of formats for a sidelink feedback channel (e.g., PSFCH) for sidelink feedback. As discussed herein, a sidelink device (e.g., a UE) may transmit a sidelink feedback message over a set of resources in accordance with a format. For example, a transmitting UE may transmit a sidelink message to a receiving UE, and the receiving UE may generate feedback for the sidelink message.

In some examples, sidelink messages may include a symbol 305 that is dedicated for automatic gain control (AGC) calibration (e.g., AGC training) and a number of symbols 310 for sidelink feedback information. The receiving UE may determine a receive power associated with transmissions received in each slot. A total received signal power (e.g., a received signal strength indicator) may vary from a first slot to a second slot. In some cases, the total received signal power of a first slot may be independent of a second slot unless the two slots have a temporal or spatial correlation. The receiving UE may perform an AGC retraining or setting at the beginning of a slot. In some examples, AGC retraining may be performed at the beginning of each slot, as it may be assumed that total received signal power may vary from the first slot to the second slot, or may be performed for a subset of slots (e.g., may be performed for a first slot of a set of temporally correlated slots). AGC may determine a front end gain to use to receive transmissions in a slot where AGC retraining is being performed, e.g., based on a total received signal power at the beginning of the slot. AGC retraining may occur over an AGC setting time which may include a measuring a received signal strength indicator, determining a gain setting, and programming the front end. Accordingly, a first symbol of a slot, such as the symbol 305, may be dedicated for AGC calibration, as interference and power level may change rapidly in sidelink communications. The first symbol may be a duplication of a second symbol of the slot.

Each of the format configurations 301, 302, and 303 correspond to a set of resources (e.g., time resources, frequency resources) that includes at least one symbol 305 that may be dedicated for AGC calibration. The set of resources may be part of a resource pool configured for sidelink feedback (e.g., for a sidelink feedback channel, such as a PSFCH). For example, in FIG. 3A, the format configuration 301 includes a symbol 305 for AGC calibration and a number of symbols 310 for sidelink feedback information. The format configuration 301 may correspond to a time domain configuration that indicates a starting symbol (e.g., the symbol 305) and a quantity of symbols (e.g., six symbols) of the resource pool.

A receiving UE may select or otherwise identify (e.g., based on an indication from a transmitting UE or a base station) the format configuration 301 and may transmit a sidelink feedback message over a set of resources in accordance with the format configuration 301. In some examples, the receiving UE may determine frequency domain resources for the sidelink feedback message based on a source ID, a destination ID, and one or more other parameters, as described with reference to FIG. 2. In other examples, the format configuration 301 may correspond to a frequency domain configuration in addition to the time domain configuration and may indicate one or more frequency resources (e.g., PRBs) of the resource pool. For instance, the frequency domain configuration may indicate a set of PRBs that are consecutive in time, such that the format configuration 301 avoids frequency hopping across symbols 310.

FIG. 3B illustrates the format configuration 302 that supports repetitions of sidelink feedback information. In some examples, a resource pool may be associated with a set of repetition factors, and a receiving UE may transmit multiple instances (i.e., repetitions) of a sidelink feedback message in accordance with a repetition factor of the set of repetition factors. Each repetition factor may correspond to one or more of a quantity of time resources (e.g., slots, mini-slots) of an associated sidelink message (e.g., PSSCH), a payload size of the sidelink message, CSI to be transmitted by the receiving UE (e.g., as part of the sidelink feedback message), or the like. In some examples, the receiving UE may select the repetition factor, and in other examples, the receiving UE may receive an indication of a repetition factor from a transmitting UE or a base station.

For example, the format configuration 302 may correspond to a set of resources associated with a repetition factor of two, and the receiving UE may transmit two instances of a sidelink feedback message. The set of resources may include a symbol 305 for AGC calibration and four symbols 310 for sidelink feedback information. In this example, one symbol 305 may be used for AGC calibration for multiple repetitions of the sidelink feedback information. A first repetition 320-a of the sidelink feedback message may include two symbols 310 and a second repetition 320-b of the sidelink feedback message may include two symbols 310. The receiving UE may transmit the sidelink feedback message over the set of resources based on the repetition factor.

In some examples, a repetition factor may be used in conjunction with frequency hopping (e.g., a frequency hopping pattern). Repetition and frequency hopping may improve time diversity and frequency diversity, respectively, of a sidelink feedback message, such that a transmitting UE is more likely to successfully receive and decode the sidelink feedback message. A receiving UE may select a frequency hopping pattern or may receive an indication of a frequency hopping pattern from a transmitting UE or a base station. The frequency hopping pattern may be part of a set of frequency hopping patterns associated with the resource pool.

In the example of FIG. 3C, the format configuration 303 corresponds to a set of resources associated with a repetition factor of two and a frequency hopping pattern, such that frequency hopping may occur between repetitions of the sidelink feedback message. The frequency hopping pattern may indicate that a first repetition 320-c is transmitted over a first set of frequency resources and a second repetition 320-d is transmitted over a second set of frequency resources (e.g., different from the first set of frequency resources).

Additionally, in this example, each repetition may include a symbol 305 for AGC calibration. The repetition 320-c includes a symbol 305 for AGC calibration and two symbols 310 for sidelink feedback information. The repetition 320-d includes a symbol 305 for AGC calibration and two symbols 310 for AGC calibration. The receiving UE may transmit the sidelink feedback message over the set of resources in accordance with the repetition factor and the frequency hopping pattern.

Figure 4:
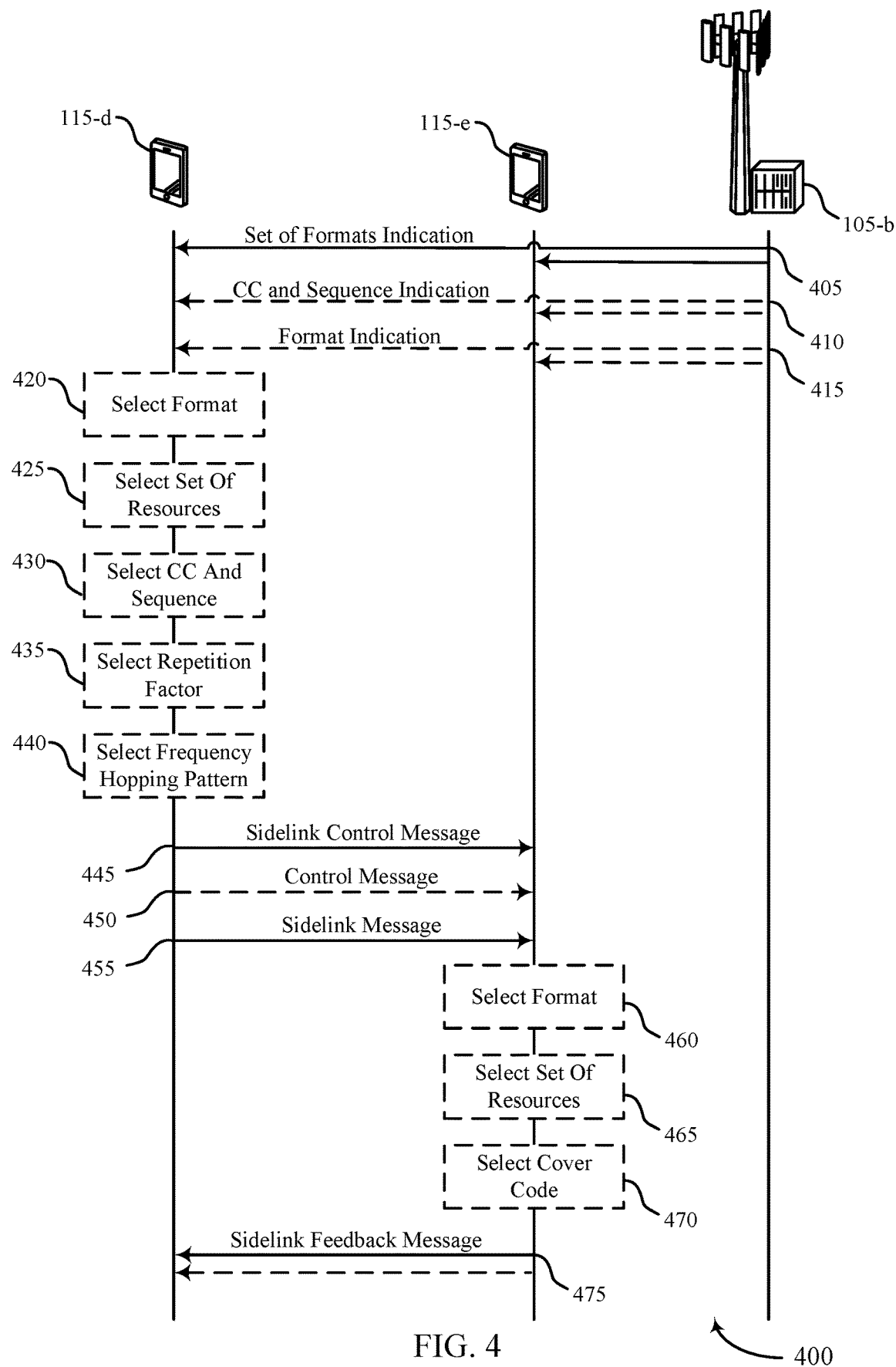
FIG. 4 illustrates an example of a process flow that supports feedback channel design for sidelink feedback in accordance with aspects of the present disclosure.

FIG. 4 illustrates an example of a process flow 400 that supports feedback channel design for sidelink feedback in accordance with aspects of the present disclosure. The process flow 400 includes UEs 115 and a base station 105-b, which may be examples of the corresponding wireless devices described with reference to FIGS. 1 and 2. In some cases, different types of wireless device may perform the same or similar procedures described herein. Alternative examples of the following may be implemented, where some steps are performed in a different order than described or are not performed at all. In some cases, steps may include additional features not mentioned below, or further steps may be added.

The process flow 400 may illustrate an example sidelink feedback procedure. For example, a UE 115-d and a UE 115-e may communicate via sidelink and may perform a sidelink feedback procedure. As described herein, the UE 115-d may transmit a sidelink message to the UE 115-e, and in response, the UE 115-e may transmit a sidelink feedback message over a set of resources based on a format for sidelink feedback. The UE 115-d may be referred to as a transmitting UE and the UE 115-e may be referred to as a receiving UE. In some examples, the UE 115-d, the UE 115-e, or both may communicate with the base station 105-b.

At 405, the base station 105-b may transmit, and the UE 115-d and the UE 115-e may receive, a message indicating a set of formats for a sidelink feedback channel (e.g., PSFCH) for sidelink feedback associated with the UE 115-d and the UE 115-e. In some examples, the UE 115-d and the UE 115-e may receive (e.g., as part of the message indicating the set of formats) an indication of a time domain configuration, a frequency domain configuration, or both, corresponding to a format of the set of formats. In such examples, the time domain configuration, the frequency domain configuration, or both, may indicate a set of resources associated with the sidelink feedback channel. The set of resources may correspond to a resource pool.

At 410, the base station 105-b may optionally transmit, and the UE 115-d and the UE 115-e may receive, an indication of one or more cover codes and one or more cell-specific sequences for the UE 115-d. In some examples, the indication may be for a cover code and a cell-specific sequence that may be associated with a resource pool that includes a set of resources.

At 415, the base station 105-b may optionally transmit, and the UE 115-d and the UE 115-e may receive, an indication of a format of the set of formats. The format may be for both the UE 115-d and the UE 115-e.

At 420, in some cases, the UE 115-d may select a format from the set of formats for a sidelink feedback message to be transmitted to the UE 115-*d* from the UE 115-*e*. The sidelink feedback message may correspond to a sidelink message (e.g., PSSCH) to be transmitted (e.g., at 455) from the UE 115-*d* to the UE 115-*e*. In some cases, the set of formats may correspond to a resource pool, and the resource pool may include a set of resources that corresponds to the format. In some examples, the format may correspond to one or more sets of resources for the sidelink feedback channel, and each of the one or more sets of resources may correspond to a respective resource identifier. Additionally, in some examples, each respective resource identifier may be associated with a respective payload size for feedback, a respective priority, a respective quality of service, or a combination thereof.

At 425, in some examples, the UE 115-*d* may select a set of resources for the sidelink feedback message from the UE 115-*e* based on an identifier associated with the UE 115-*d*, an identifier associated with the UE 115-*e*, or a combination thereof. In some examples, the set of resources may be part of a resource pool and may correspond to a format of the set of formats (e.g., as indicated at 415 and/or selected at 420). The UE 115-*d* may select the set of resources based on a resource block allocation associated with the resource pool. Additionally, in some cases, the UE 115-*d* may select a bundle size for the sidelink feedback message based on the resource block allocation or the set of resources. In any case, the set of resources may be the set of resources indicated by the time domain configuration, the frequency domain configuration, or both at 405. In some cases, the set of resources may correspond to the cover code and cell-specific sequence indicated at 410.

At 430, in some cases, the UE 115-*d* may select a cover code (e.g., from the one or more cover codes indicated at 410) and a cell-specific sequence (e.g., from the one or more cell-specific sequences indicated at 410). In some examples, the UE 115-*d* may select the cover code based on a slot index, a mini-slot index, a number of symbols of the sidelink message, an identifier of the UE 115-*d*, an identifier of the UE 115-*e*, or a combination thereof.

At 435, in some examples, the UE 115-*d* may select a repetition factor of a set of repetition factors associated with a resource pool that includes the set of resources, e.g., as selected at 425. In some examples, the UE 115-*d* may select the repetition factor based on CSI associated with the UE 115-*e*, a number of time resources associated with the sidelink message, a payload size associated with the sidelink feedback message, or a combination thereof.

At 440, in some cases, the UE 115-*d* may select a frequency hopping pattern from a set of frequency hopping patterns for the resource pool.

At 445, the UE 115-*d* may transmit, and the UE 115-*e* may receive, a sidelink control message that indicates scheduling information for the sidelink message for the UE 115-*e*. The UE 115-*d* may transmit the sidelink control message over a sidelink control channel, such as a PSCCH. In some examples, the sidelink control message may include an indication of the format (e.g., as selected at 420) based on the scheduling information, and the scheduling information may indicate a number of time resources for the sidelink message. In some cases, the sidelink control message may include an indication of the format based on a CSI trigger associated with the UE 115-*d*. For example, if CSI is triggered for the UE 115-*d*, the UE 115-*d* may include the indication of the format in the sidelink control message. In some examples, the sidelink control message may be an example of SCI, a PC5 message, an RRC message, or a MAC-CE.

In some cases, the sidelink control message may indicate the frequency hopping pattern, the bundle size, the repetition factor, or any combination thereof.

At 450, in some examples, the UE 115-*d* may optionally transmit, and the UE 115-*e* may optionally receive, a control message, such as an SCI message, a PC5 message, an RRC message, a MAC-CE, or the like. The control message may include or may indicate the cover code and the cell-specific sequence selected by the UE 115-*d* at 430.

At 455, the UE 115-*d* may transmit, and the UE 115-*e* may receive, the sidelink message in accordance with the scheduling information. The UE 115-*d* may transmit the sidelink message over a sidelink shared channel, such as a PSSCH.

At 460, in some examples, the UE 115-*e* may select a format, from the set of formats, for the sidelink feedback message to be transmitted to the UE 115-*d*. In some cases, the set of formats may correspond to a resource pool, and the resource pool may include a set of resources that corresponds to the format. In some examples, the format may correspond to one or more sets of resources for the sidelink feedback channel, and each of the one or more sets of resources may correspond to a respective resource identifier. Additionally, in some examples, each respective resource identifier may be associated with a respective payload size for feedback, a respective priority, a respective quality of service, or a combination thereof.

At 465, in some cases, the UE 115-*e* may select a set of resources for the sidelink feedback message. The UE 115-*e* may select the set of resources based on an identifier associated with the UE 115-*d*, an identifier associated with the UE 115-*e*, a payload size associated with the sidelink feedback message, a quality of service associated with the sidelink message, or a combination thereof. In some examples, the set of resources may be part of a resource pool and may correspond to a format of the set of formats (e.g., as indicated at 415 and/or selected at 460). The UE 115-*e* may select the set of resources based on a resource block allocation associated with the resource pool. Additionally, in some cases, the UE 115-*e* may select a bundle size for the sidelink feedback message based on the resource block allocation or the set of resources. In any case, the set of resources may be the set of resources indicated by the time domain configuration, the frequency domain configuration, or both at 405. In some cases, the set of resources may correspond to the cover code and cell-specific sequence indicated at 410.

At 470, in some examples, the UE 115-*e* may select a cover code, for example, based on a slot index, a mini-slot index, a number of symbols of the sidelink message, an identifier of the UE 115-*d*, an identifier of the UE 115-*e*, or a combination thereof.

At 475, the UE 115-*e* may transmit, and the UE 115-*d* may receive, the sidelink feedback message using a set of resources associated with a sidelink feedback channel (e.g., PSFCH). For example, the UE 115-*d* may monitor the set of resources associated with the sidelink feedback channel for the sidelink feedback message, and the set of resources may be based on a format of the set of formats. The format of the set of formats may correspond to the format indicated at 415 or selected at 420 or 460. The set of resources may correspond to the set of resources selected at 425 or 465.

In some examples, at 475, the UE 115-*e* may transmit, and the UE 115-*d* may receive, one or more instances of the sidelink feedback message based on the repetition factor. For example, the UE 115-*e* may transmit, and the UE 115-*d* may receive, a first instance of the sidelink feedback message and a second instance of the sidelink feedback message based on a frequency hopping pattern associated with the resource pool (e.g., as indicated in the sidelink control message).

Figure 5:
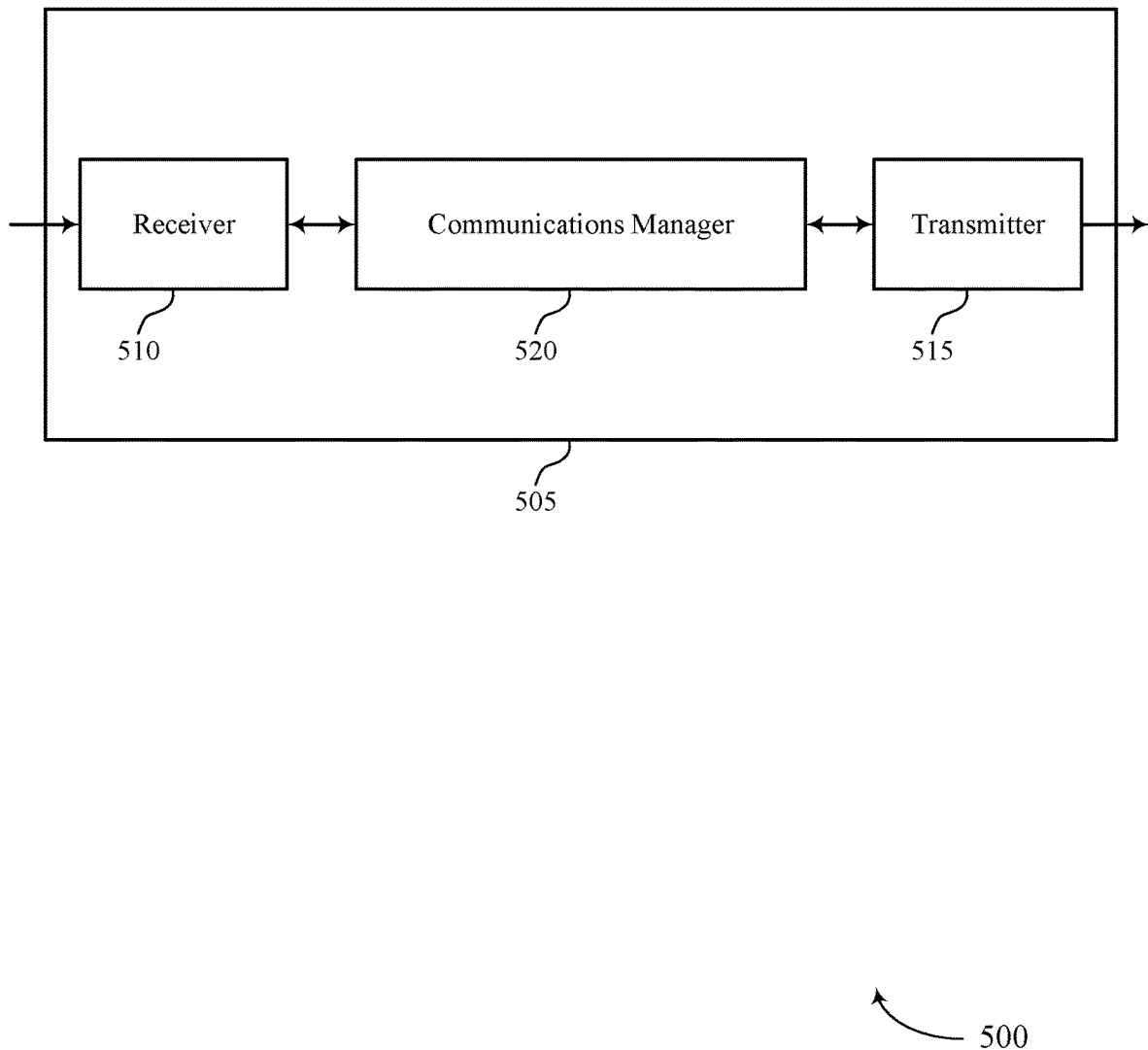
FIGS. 5 and 6 show block diagrams of devices that support feedback channel design for sidelink feedback in accordance with aspects of the present disclosure.

FIG. 5 shows a block diagram 500 of a device 505 that supports feedback channel design for sidelink feedback in accordance with aspects of the present disclosure. The device 505 may be an example of aspects of a UE 115 as described herein. The device 505 may include a receiver 510, a transmitter 515, and a communications manager 520. The device 505 may also include one or more processors, memory coupled with the one or more processors, and instructions stored in the memory that are executable by the one or more processors to enable the one or more processors to perform the sidelink feedback features discussed herein. Each of these components may be in communication with one another (e.g., via one or more buses).

The receiver 510 may provide a means for receiving information such as packets, user data, control information, or any combination thereof associated with various information channels (e.g., control channels, data channels, information channels related to feedback channel design for sidelink feedback). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to feedback channel design for sidelink feedback). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of feedback channel design for sidelink feedback as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a first UE in accordance with examples as disclosed herein. For example, the communications manager 520 may be configured as or otherwise support a means for receiving, from a base station, a message indicating a set of formats for a sidelink feedback channel for sidelink feedback associated with the first UE and a second UE. The communications manager 520 may be configured as or otherwise support a means for transmitting, to the second UE, a sidelink control message indicating scheduling information for a sidelink message for the second UE. The communications manager 520 may be configured as or otherwise support a means for transmitting the sidelink message to the second UE based on the scheduling information. The communications manager 520 may be configured as or otherwise support a means for monitoring a set of resources associated with the sidelink feedback channel for a sidelink feedback message from the second UE, the set of resources based on a format of the set of formats for the sidelink feedback channel.

Additionally or alternatively, the communications manager 520 may support wireless communications at a second UE in accordance with examples as disclosed herein. For example, the communications manager 520 may be configured as or otherwise support a means for receiving, from a base station, a message indicating a set of formats for a sidelink feedback channel for sidelink feedback associated with a first UE and the second UE. The communications manager 520 may be configured as or otherwise support a means for receiving, from the first UE, a sidelink control message indicating scheduling information for a sidelink message for the second UE. The communications manager 520 may be configured as or otherwise support a means for receiving the sidelink message from the first UE based on the scheduling information. The communications manager 520 may be configured as or otherwise support a means for transmitting, to the first UE, a sidelink feedback message using a set of resources associated with the sidelink feedback channel, the set of resources based on a format of the set of formats for the sidelink feedback channel.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for improved reliability and reduced latency in sidelink feedback. For example, by transmitting a sidelink feedback message in accordance with a format as described herein, the device 505 may avoid long delays associated with transmitting only a single bit of feedback. As such, the techniques described herein support more efficient utilization of communication resources, which may, in turn, reduce power consumption at the device 505.

Figure 6:
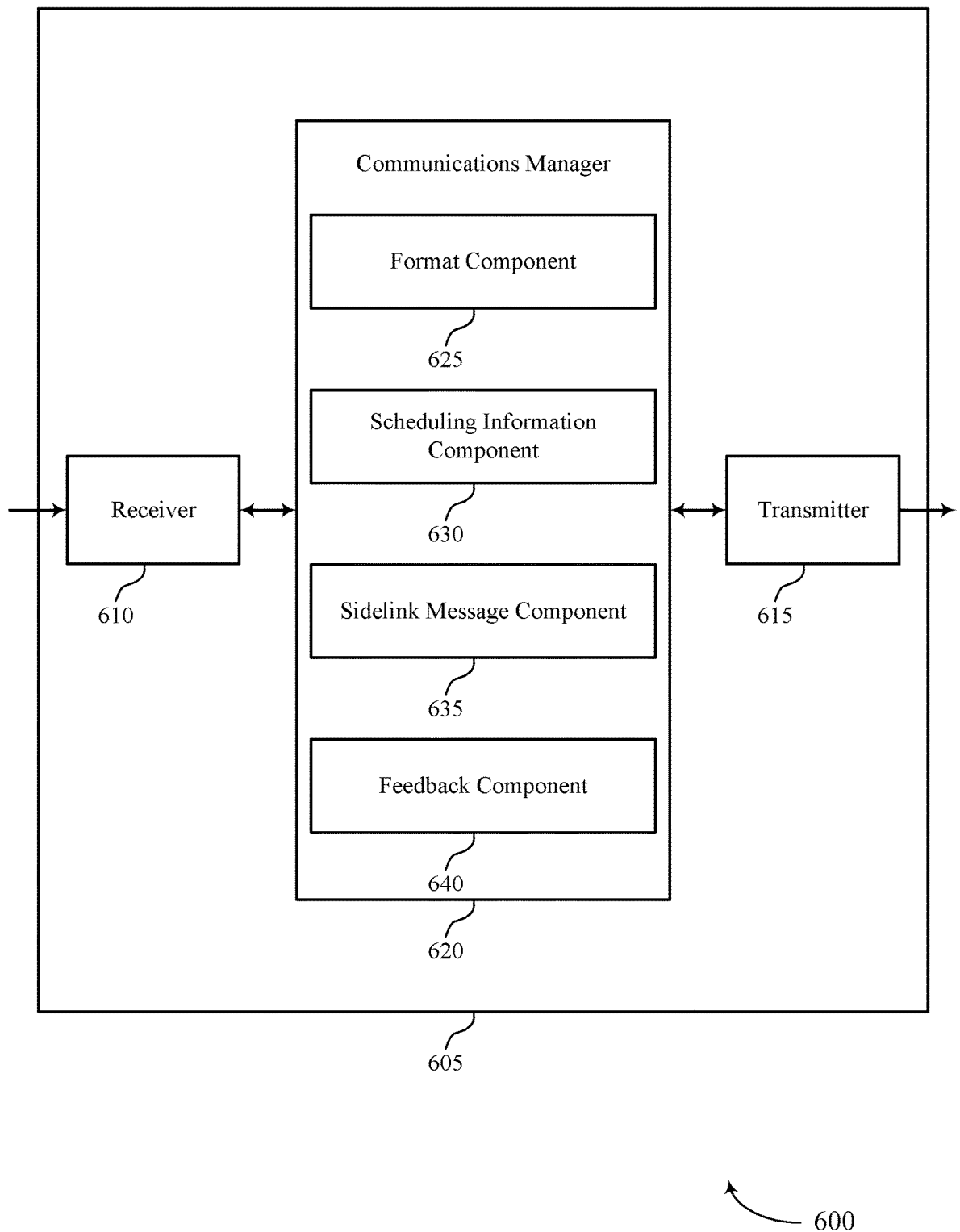

FIG. 6 shows a block diagram 600 of a device 605 that supports feedback channel design for sidelink feedback in accordance with aspects of the present disclosure. The device 605 may be an example of aspects of a device 505 or a UE 115 as described herein. The device 605 may include a receiver 610, a transmitter 615, and a communications manager 620. The device 605 may also include one or more processors, memory coupled with the one or more processors, and instructions stored in the memory that are executable by the one or more processors to enable the one or more processors to perform the feedback channel design for sidelink feedback features discussed herein. Each of these components may be in communication with one another (e.g., via one or more buses).

The receiver 610 may provide a means for receiving information such as packets, user data, control information, or any combination thereof associated with various information channels (e.g., control channels, data channels, information channels related to feedback channel design for sidelink feedback). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to feedback channel design for sidelink feedback). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of feedback channel design for sidelink feedback as described herein. For example, the communications manager 620 may include a format component 625, a scheduling information component 630, a sidelink message component 635, a feedback component 640, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a first UE in accordance with examples as disclosed herein. The format component 625 may be configured as or otherwise support a means for receiving, from a base station, a message indicating a set of formats for a sidelink feedback channel for sidelink feedback associated with the first UE and a second UE. The scheduling information component 630 may be configured as or otherwise support a means for transmitting, to the second UE, a sidelink control message indicating scheduling information for a sidelink message for the second UE. The sidelink message component 635 may be configured as or otherwise support a means for transmitting the sidelink message to the second UE based on the scheduling information. The feedback component 640 may be configured as or otherwise support a means for monitoring a set of resources associated with the sidelink feedback channel for a sidelink feedback message from the second UE, the set of resources based on a format of the set of formats for the sidelink feedback channel.

Additionally or alternatively, the communications manager 620 may support wireless communications at a second UE in accordance with examples as disclosed herein. The format component 625 may be configured as or otherwise support a means for receiving, from a base station, a message indicating a set of formats for a sidelink feedback channel for sidelink feedback associated with a first UE and the second UE. The scheduling information component 630 may be configured as or otherwise support a means for receiving, from the first UE, a sidelink control message indicating scheduling information for a sidelink message for the second UE. The sidelink message component 635 may be configured as or otherwise support a means for receiving the sidelink message from the first UE based on the scheduling information. The feedback component 640 may be configured as or otherwise support a means for transmitting, to the first UE, a sidelink feedback message using a set of resources associated with the sidelink feedback channel, the set of resources based on a format of the set of formats for the sidelink feedback channel.

In some cases, the format component 625, the scheduling information component 630, the sidelink message component 635, and the feedback component 640 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the format component 625, the scheduling information component 630, the sidelink message component 635, and the feedback component 640 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

In some cases, the format component 625, the scheduling information component 630, the sidelink message component 635, and the feedback component 640 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of feedback channel design for sidelink feedback discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 7:
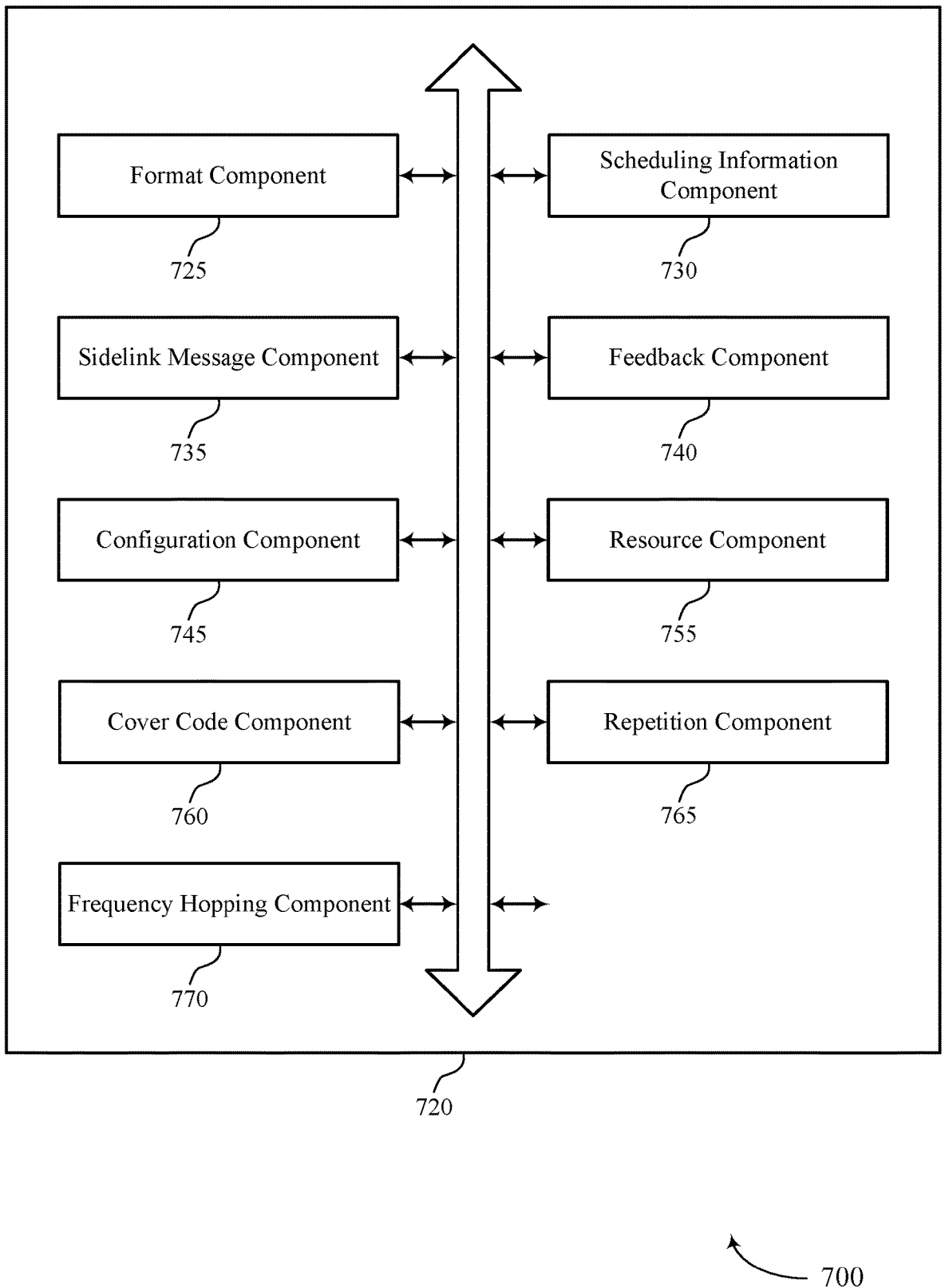
FIG. 7 shows a block diagram of a communications manager that supports feedback channel design for sidelink feedback in accordance with aspects of the present disclosure.

FIG. 7 shows a block diagram 700 of a communications manager 720 that supports feedback channel design for sidelink feedback in accordance with aspects of the present disclosure. The communications manager 720 may be an example of aspects of a communications manager 520, a communications manager 620, or both, as described herein. The communications manager 720, or various components thereof, may be an example of means for performing various aspects of feedback channel design for sidelink feedback as described herein. For example, the communications manager 720 may include a format component 725, a scheduling information component 730, a sidelink message component 735, a feedback component 740, a configuration component 745, a resource component 755, a cover code component 760, a repetition component 765, a frequency hopping component 770, or any combination thereof. Each of these components may communicate, directly or indirectly, with one another (e.g., via one or more buses).

The communications manager 720 may support wireless communications at a first UE in accordance with examples as disclosed herein. The format component 725 may be configured as or otherwise support a means for receiving, from a base station, a message indicating a set of formats for a sidelink feedback channel for sidelink feedback associated with the first UE and a second UE. The scheduling information component 730 may be configured as or otherwise support a means for transmitting, to the second UE, a sidelink control message indicating scheduling information for a sidelink message for the second UE. The sidelink message component 735 may be configured as or otherwise support a means for transmitting the sidelink message to the second UE based on the scheduling information. The feedback component 740 may be configured as or otherwise support a means for monitoring a set of resources associated with the sidelink feedback channel for a sidelink feedback message from the second UE, the set of resources based on a format of the set of formats for the sidelink feedback channel.

In some examples, the format component 725 may be configured as or otherwise support a means for selecting the format from the set of formats, where the set of resources corresponds to the format and the set of formats corresponds to a resource pool that includes the set of resources.

In some examples, the format component 725 may be configured as or otherwise support a means for transmitting an indication of the format in the sidelink control message based on the scheduling information for the sidelink message, where the scheduling information indicates a number of time resources for the sidelink message. In some examples, the format component 725 may be configured as or otherwise support a means for transmitting an indication of the format in the sidelink control message based on a CSI trigger associated with the first UE. In some examples, the format component 725 may be configured as or otherwise support a means for transmitting an indication of the format in the sidelink control message, where the sidelink control message includes one of a sidelink control information message, a PC5 message, an RRC message, or a MAC-CE.

In some examples, the format component 725 may be configured as or otherwise support a means for receiving an indication of the format from the base station, where the format is for both the first UE and the second UE.

In some examples, to support receiving the message indicating the set of formats, the configuration component 745 may be configured as or otherwise support a means for receiving an indication of a time domain configuration, a frequency domain configuration, or both corresponding to the format, where the time domain configuration, the frequency domain configuration, or both indicate the set of resources.

In some examples, the format of the set of formats corresponds to one or more sets of resources for the sidelink feedback channel, each of the one or more sets of resources corresponding to a respective resource identifier. In some examples, each respective resource identifier is associated with a respective payload size for feedback, a respective priority, a respective quality of service, or a combination thereof.

In some examples, the resource component 755 may be configured as or otherwise support a means for selecting the set of resources based on an identifier associated with the first UE, an identifier associated with the second UE, or a combination thereof.

In some examples, the cover code component 760 may be configured as or otherwise support a means for receiving, from the base station, an indication of a cover code and a cell-specific sequence for the first UE, where the cover code and the cell-specific sequence are associated with a resource pool that includes the set of resources.

In some examples, the cover code component 760 may be configured as or otherwise support a means for receiving, from the base station, an indication of a set of multiple cover codes and a set of multiple cell-specific sequences for the first UE, where the set of multiple cover codes and the set of multiple cell-specific sequences are associated with a resource pool that includes the set of resources. In some examples, the cover code component 760 may be configured as or otherwise support a means for selecting a cover code from the set of multiple cover codes and a cell-specific sequence from the set of multiple cell-specific sequences. In some examples, the cover code component 760 may be configured as or otherwise support a means for transmitting, to the second UE, the cover code and the cell-specific sequence in a control message, where the control message includes one of a sidelink control message, a PC5 message, an RRC message, a MAC-CE.

In some examples, the cover code component 760 may be configured as or otherwise support a means for selecting a cover code based on a slot index, a mini-slot index, a number of symbols of the sidelink message, an identifier of the first UE, an identifier of the second UE, or any combination thereof.

In some examples, the repetition component 765 may be configured as or otherwise support a means for selecting a repetition factor of a set of repetition factors associated with a resource pool that includes the set of resources based on CSI associated with the second UE, a number of time resources associated with the sidelink message, a payload size associated with the feedback message, or any combination thereof. In some examples, the repetition component 765 may be configured as or otherwise support a means for transmitting the repetition factor to the second UE in the sidelink control message.

In some examples, to support monitoring, the feedback component 740 may be configured as or otherwise support a means for receiving one or more instances of the sidelink feedback message from the second UE based on the repetition factor.

In some examples, to support receiving the one or more instances of the sidelink feedback message, the frequency hopping component 770 may be configured as or otherwise support a means for receiving a first instance of the sidelink feedback message and a second instance of the sidelink feedback message based on a frequency hopping pattern associated with the resource pool.

In some examples, the frequency hopping component 770 may be configured as or otherwise support a means for selecting the frequency hopping pattern from a set of frequency hopping patterns for the resource pool. In some examples, the frequency hopping component 770 may be configured as or otherwise support a means for transmitting the frequency hopping pattern to the second UE in the sidelink control message, where the sidelink control message includes a sidelink control information message, a PC5 message, an RRC message, a MAC-CE, or any combination thereof.

In some examples, the resource component 755 may be configured as or otherwise support a means for selecting the set of resources based on a resource block allocation associated with a resource pool that includes the set of resources. In some examples, the resource component 755 may be configured as or otherwise support a means for selecting a bundle size for the sidelink feedback message based on the resource block allocation or the set of resources. In some examples, the resource component 755 may be configured as or otherwise support a means for transmitting an indication of the bundle size in the sidelink control message.

Additionally or alternatively, the communications manager 720 may support wireless communications at a second UE in accordance with examples as disclosed herein. In some examples, the format component 725 may be configured as or otherwise support a means for receiving, from a base station, a message indicating a set of formats for a sidelink feedback channel for sidelink feedback associated with a first UE and the second UE. In some examples, the scheduling information component 730 may be configured as or otherwise support a means for receiving, from the first UE, a sidelink control message indicating scheduling information for a sidelink message for the second UE. In some examples, the sidelink message component 735 may be configured as or otherwise support a means for receiving the sidelink message from the first UE based on the scheduling information. In some examples, the feedback component 740 may be configured as or otherwise support a means for transmitting, to the first UE, a sidelink feedback message using a set of resources associated with the sidelink feedback channel, the set of resources based on a format of the set of formats for the sidelink feedback channel.

In some examples, the format component 725 may be configured as or otherwise support a means for selecting the format from the set of formats, where the set of resources corresponds to the format and the set of formats corresponds to a resource pool that includes the set of resources. In some examples, the format component 725 may be configured as or otherwise support a means for receiving an indication of the format in the sidelink control message based on the scheduling information for the sidelink message, where the scheduling information indicates a number of time resources for the sidelink message.

In some examples, the format component 725 may be configured as or otherwise support a means for receiving an indication of the format in the sidelink control message based on a CSI trigger associated with the first UE. In some examples, the format component 725 may be configured as or otherwise support a means for receiving an indication of the format in the sidelink control message, where the sidelink control message includes one of a sidelink control information message, a PC5 message, an RRC message, or a MAC-CE. In some examples, the format component 725 may be configured as or otherwise support a means for receiving an indication of the format from the base station, where the format is for both the first UE and the second UE.

In some examples, to support receiving the message indicating the set of formats, the configuration component 745 may be configured as or otherwise support a means for receiving an indication of a time domain configuration, a frequency domain configuration, or both corresponding to the format, where the time domain configuration, the frequency domain configuration, or both indicate the set of resources.

In some examples, the format of the set of formats corresponds to one or more sets of resources for the sidelink feedback channel, each of the one or more sets of resources corresponding to a respective resource identifier. In some examples, each respective resource identifier is associated with a respective payload size for feedback, a respective priority, a respective quality of service, or a combination thereof.

In some examples, the resource component 755 may be configured as or otherwise support a means for selecting the set of resources based on an identifier associated with the first UE, an identifier associated with the second UE, a payload size associated with the sidelink feedback message, a priority associated with the sidelink message, a quality of service associated with the sidelink message, or a combination thereof.

In some examples, the cover code component 760 may be configured as or otherwise support a means for receiving, from the base station, an indication of a cover code and a cell-specific sequence for the second UE, where the cover code and the cell-specific sequence are associated with a resource pool that includes the set of resources.

In some examples, the cover code component 760 may be configured as or otherwise support a means for receiving, from the first UE and in a control message, an indication of a cover code and a cell-specific sequence for the second UE, where the cover code is from a set of multiple cover codes and the cell-specific sequence is from a set of multiple cell-specific sequences, and where the set of multiple cover codes and the set of multiple cell-specific sequences are associated with a resource pool that includes the set of resources. In some examples, the cover code component 760 may be configured as or otherwise support a means for selecting a cover code based on a slot index, a mini-slot index, a number of symbols of the sidelink message, an identifier of the first UE, an identifier of the second UE, or any combination thereof.

In some examples, the repetition component 765 may be configured as or otherwise support a means for receiving an indication of a repetition factor of a set of repetition factors associated with a resource pool that includes the set of resources based on CSI associated with the second UE, a number of time resources associated with the sidelink message, a payload size associated with the feedback message, or any combination thereof. In some examples, to support transmitting the one or more instances, the feedback component 740 may be configured as or otherwise support a means for transmitting one or more instances of the sidelink feedback message to the first UE based on the repetition factor.

In some examples, the frequency hopping component 770 may be configured as or otherwise support a means for transmitting a first instance of the sidelink feedback message and a second instance of the sidelink feedback message based on a frequency hopping pattern associated with the resource pool. In some examples, the frequency hopping component 770 may be configured as or otherwise support a means for receiving the frequency hopping pattern from the first UE in the sidelink control message, where the sidelink control message includes a sidelink control information message, a PC5 message, an RRC message, a MAC-CE, or any combination thereof.

In some examples, the resource component 755 may be configured as or otherwise support a means for selecting the set of resources based on a resource block allocation associated with a resource pool that includes the set of resources. In some examples, the resource component 755 may be configured as or otherwise support a means for selecting a bundle size for the sidelink feedback message based on the resource block allocation or the set of resources. In some examples, the resource component 755 may be configured as or otherwise support a means for receiving an indication of the bundle size in the sidelink control message.

Figure 8:
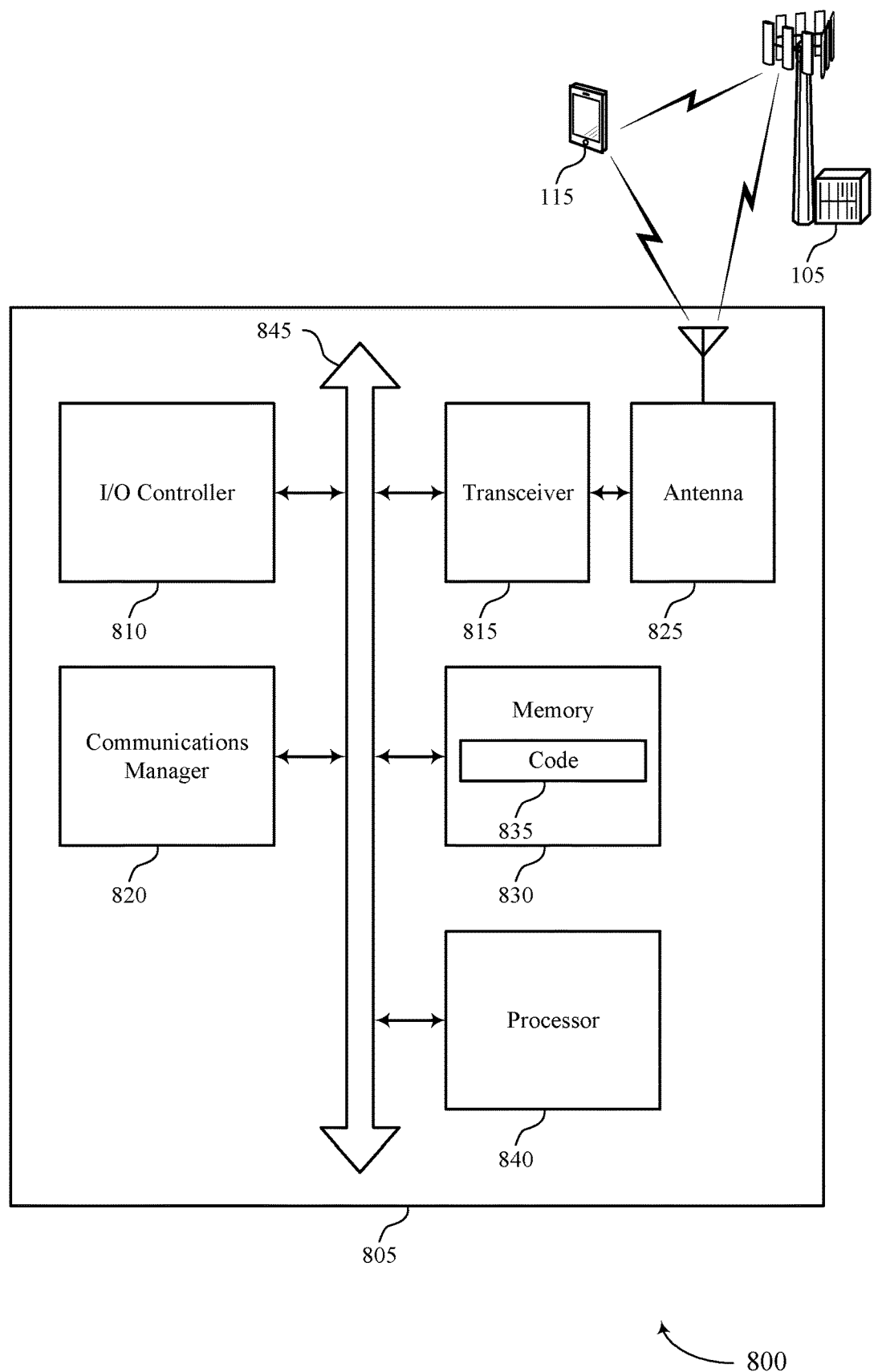
FIG. 8 shows a diagram of a system including a device that supports feedback channel design for sidelink feedback in accordance with aspects of the present disclosure.

In some cases, the format component 725, the scheduling information component 730, the sidelink message component 735, the feedback component 740, the configuration component 745, the resource component 755, the cover code component 760, a repetition component 765, or the frequency hopping component 770 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of feedback channel design for sidelink feedback discussed herein FIG. 8 shows a diagram of a system 800 including a device 805 that supports feedback channel design for sidelink feedback in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting feedback channel design for sidelink feedback). For example, the device 805 or a component of the device 805 may include a processor 840 and memory 830 coupled to the processor 840, the processor 840 and memory 830 configured to perform various functions described herein.

The communications manager 820 may support wireless communications at a first UE in accordance with examples as disclosed herein. For example, the communications manager 820 may be configured as or otherwise support a means for receiving, from a base station, a message indicating a set of formats for a sidelink feedback channel for sidelink feedback associated with the first UE and a second UE. The communications manager 820 may be configured as or otherwise support a means for transmitting, to the second UE, a sidelink control message indicating scheduling information for a sidelink message for the second UE. The communications manager 820 may be configured as or otherwise support a means for transmitting the sidelink message to the second UE based on the scheduling information. The communications manager 820 may be configured as or otherwise support a means for monitoring a set of resources associated with the sidelink feedback channel for a sidelink feedback message from the second UE, the set of resources based on a format of the set of formats for the sidelink feedback channel.

Additionally or alternatively, the communications manager 820 may support wireless communications at a second UE in accordance with examples as disclosed herein. For example, the communications manager 820 may be configured as or otherwise support a means for receiving, from a base station, a message indicating a set of formats for a sidelink feedback channel for sidelink feedback associated with a first UE and the second UE. The communications manager 820 may be configured as or otherwise support a means for receiving, from the first UE, a sidelink control message indicating scheduling information for a sidelink message for the second UE. The communications manager 820 may be configured as or otherwise support a means for receiving the sidelink message from the first UE based on the scheduling information. The communications manager 820 may be configured as or otherwise support a means for transmitting, to the first UE, a sidelink feedback message using a set of resources associated with the sidelink feedback channel, the set of resources based on a format of the set of formats for the sidelink feedback channel.

By including or configuring the communications manager 820 in accordance with examples as described herein, the device 805 may support techniques for improved reliability and reduced latency in sidelink feedback. For example, by transmitting a sidelink feedback message in accordance with a format as described herein, the device 805 may adapt to varying channel conditions and QoS requirements of different traffic types. As such, the techniques described herein support more efficient utilization of communication resources, which may, in turn, reduce system latency, improve throughput, and increase reliability.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of feedback channel design for sidelink feedback as described herein, or the processor 840 and the memory 830 may be otherwise configured to perform or support such operations.

Figure 9:
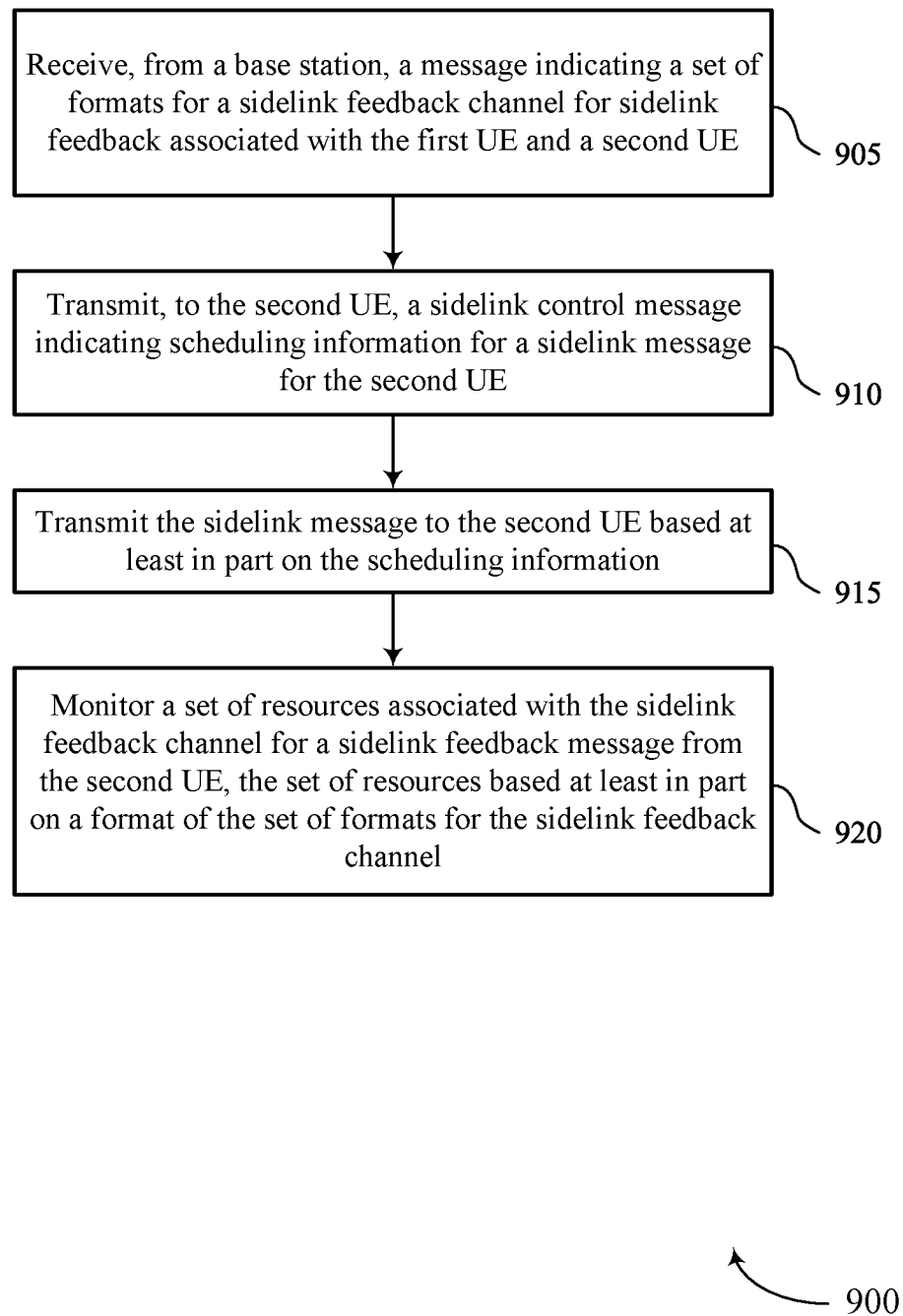
FIGS. 9 and 12 show flowcharts illustrating methods that support feedback channel design for sidelink feedback in accordance with aspects of the present disclosure.

FIG. 9 shows a flowchart illustrating a method 900 that supports feedback channel design for sidelink feedback in accordance with aspects of the present disclosure. The operations of the method 900 may be implemented by a UE or its components as described herein. For example, the operations of the method 900 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 905, the method may include receiving, from a base station, a message indicating a set of formats for a sidelink feedback channel for sidelink feedback associated with the first UE and a second UE. The operations of 905 may be performed in accordance with examples as disclosed herein. In some examples, aspects of the operations of 905 may be performed by a format component 725 as described with reference to FIG. 7.

At 910, the method may include transmitting, to the second UE, a sidelink control message indicating scheduling information for a sidelink message for the second UE. The operations of 910 may be performed in accordance with examples as disclosed herein. In some examples, aspects of the operations of 910 may be performed by a scheduling information component 730 as described with reference to FIG. 7.

At 915, the method may include transmitting the sidelink message to the second UE based on the scheduling information. The operations of 915 may be performed in accordance with examples as disclosed herein. In some examples, aspects of the operations of 915 may be performed by a sidelink message component 735 as described with reference to FIG. 7.

At 920, the method may include monitoring a set of resources associated with the sidelink feedback channel for a sidelink feedback message from the second UE, the set of resources based on a format of the set of formats for the sidelink feedback channel. The operations of 920 may be performed in accordance with examples as disclosed herein. In some examples, aspects of the operations of 920 may be performed by a feedback component 740 as described with reference to FIG. 7.

Figure 10:
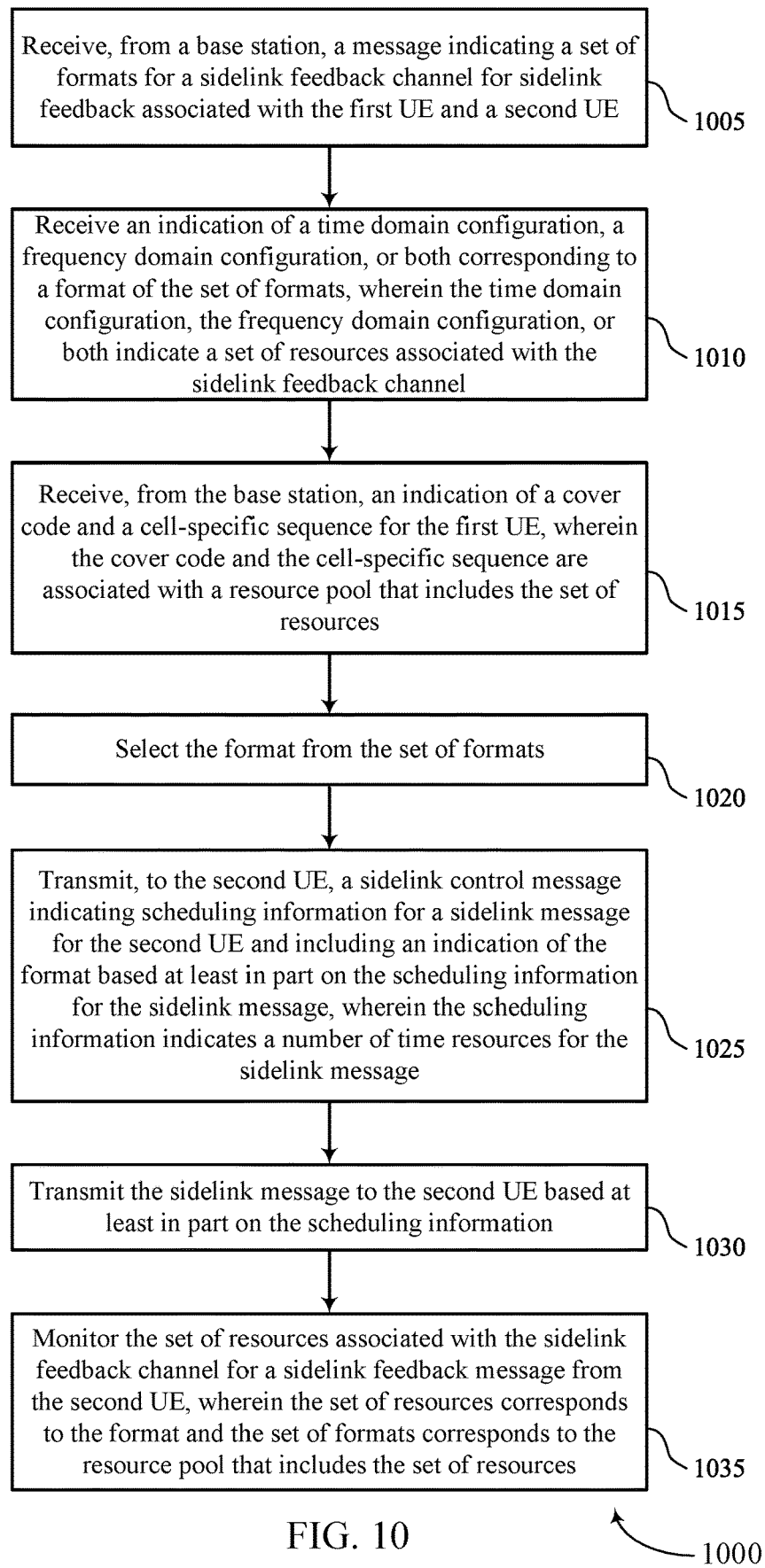

FIG. 10 shows a flowchart illustrating a method 1000 that supports feedback channel design for sidelink feedback in accordance with aspects of the present disclosure. The operations of the method 1000 may be implemented by a UE or its components as described herein. For example, the operations of the method 1000 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1005, the method may include receiving, from a base station, a message indicating a set of formats for a sidelink feedback channel for sidelink feedback associated with the first UE and a second UE. The operations of 1005 may be performed in accordance with examples as disclosed herein. In some examples, aspects of the operations of 1005 may be performed by a format component 725 as described with reference to FIG. 7.

At 1010, the method may include receiving an indication of a time domain configuration, a frequency domain configuration, or both corresponding to a format of the set of formats, where the time domain configuration, the frequency domain configuration, or both indicate a set of resources associated with the sidelink feedback channel. The operations of 1010 may be performed in accordance with examples as disclosed herein. In some examples, aspects of the operations of 1010 may be performed by a configuration component 745 as described with reference to FIG. 7.

At 1015, the method may include receiving, from the base station, an indication of a cover code and a cell-specific sequence for the first UE, where the cover code and the cell-specific sequence are associated with a resource pool that includes the set of resources. The operations of 1015 may be performed in accordance with examples as disclosed herein. In some examples, aspects of the operations of 1015 may be performed by a cover code component 760 as described with reference to FIG. 7.

At 1020, the method may include selecting the format from the set of formats. The operations of 1020 may be performed in accordance with examples as disclosed herein. In some examples, aspects of the operations of 1020 may be performed by a format component 725 as described with reference to FIG. 7.

At 1025, the method may include transmitting, to the second UE, a sidelink control message indicating scheduling information for a sidelink message for the second UE and including an indication of the format based on the scheduling information for the sidelink message, where the scheduling information indicates a number of time resources for the sidelink message. The operations of 1025 may be performed in accordance with examples as disclosed herein. In some examples, aspects of the operations of 1025 may be performed by a scheduling information component 730 as described with reference to FIG. 7.

At 1030, the method may include transmitting the sidelink message to the second UE based on the scheduling information. The operations of 1030 may be performed in accordance with examples as disclosed herein. In some examples, aspects of the operations of 1030 may be performed by a sidelink message component 735 as described with reference to FIG. 7.

At 1035, the method may include monitoring the set of resources associated with the sidelink feedback channel for a sidelink feedback message from the second UE, where the set of resources corresponds to the format and the set of formats corresponds to the resource pool that includes the set of resources. The operations of 1035 may be performed in accordance with examples as disclosed herein. In some examples, aspects of the operations of 1035 may be performed by a feedback component 740 as described with reference to FIG. 7.

Figure 11:
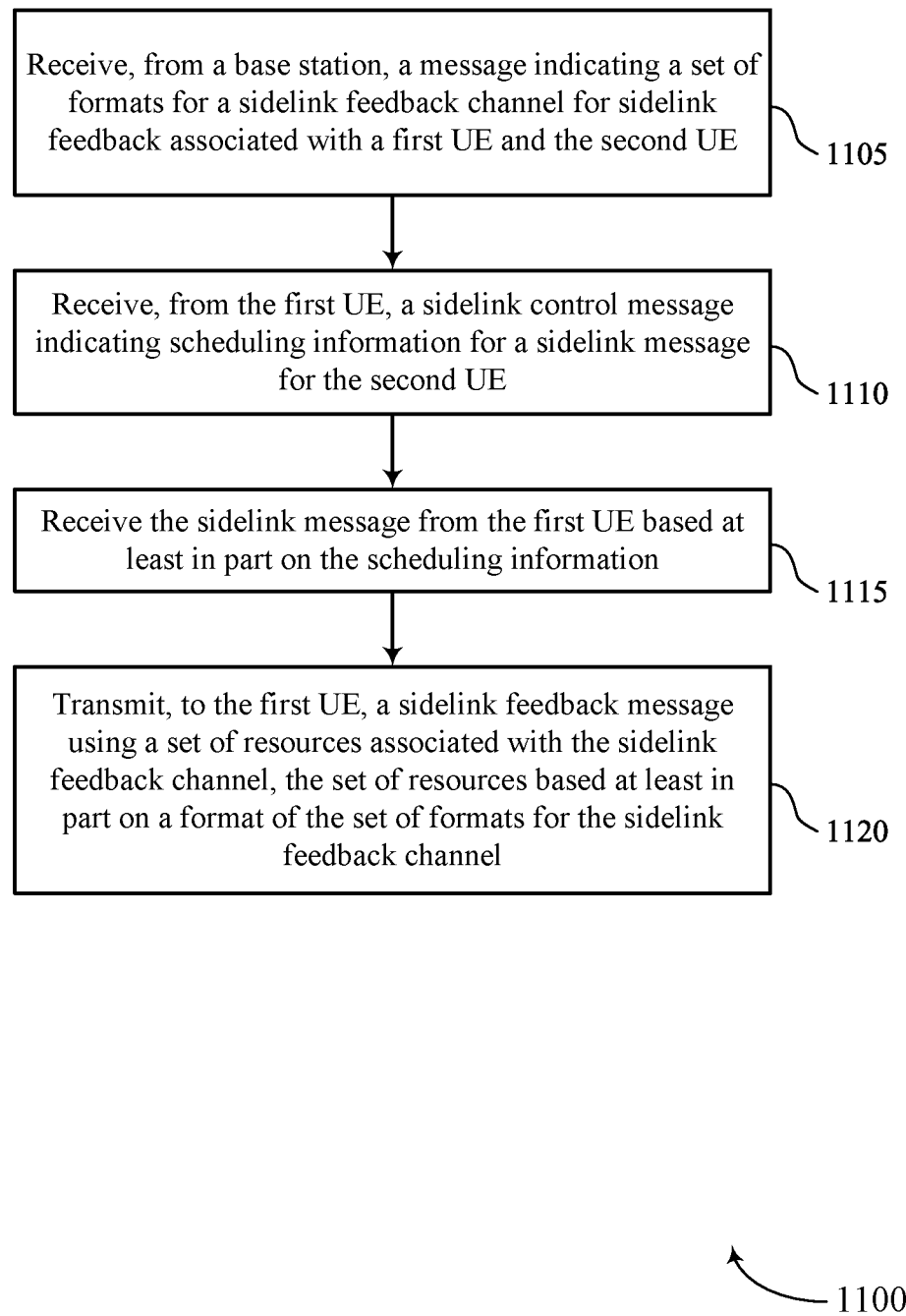

FIG. 11 shows a flowchart illustrating a method 1100 that supports feedback channel design for sidelink feedback in accordance with aspects of the present disclosure. The operations of the method 1100 may be implemented by a UE or its components as described herein. For example, the operations of the method 1100 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1105, the method may include receiving, from a base station, a message indicating a set of formats for a sidelink feedback channel for sidelink feedback associated with a first UE and the second UE. The operations of 1105 may be performed in accordance with examples as disclosed herein. In some examples, aspects of the operations of 1105 may be performed by a format component 725 as described with reference to FIG. 7.

At 1110, the method may include receiving, from the first UE, a sidelink control message indicating scheduling information for a sidelink message for the second UE. The operations of 1110 may be performed in accordance with examples as disclosed herein. In some examples, aspects of the operations of 1110 may be performed by a scheduling information component 730 as described with reference to FIG. 7.

At 1115, the method may include receiving the sidelink message from the first UE based on the scheduling information. The operations of 1115 may be performed in accordance with examples as disclosed herein. In some examples, aspects of the operations of 1115 may be performed by a sidelink message component 735 as described with reference to FIG. 7.

At 1120, the method may include transmitting, to the first UE, a sidelink feedback message using a set of resources associated with the sidelink feedback channel, the set of resources based on a format of the set of formats for the sidelink feedback channel. The operations of 1120 may be performed in accordance with examples as disclosed herein.

In some examples, aspects of the operations of 1120 may be performed by a feedback component 740 as described with reference to FIG. 7.

Figure 12:
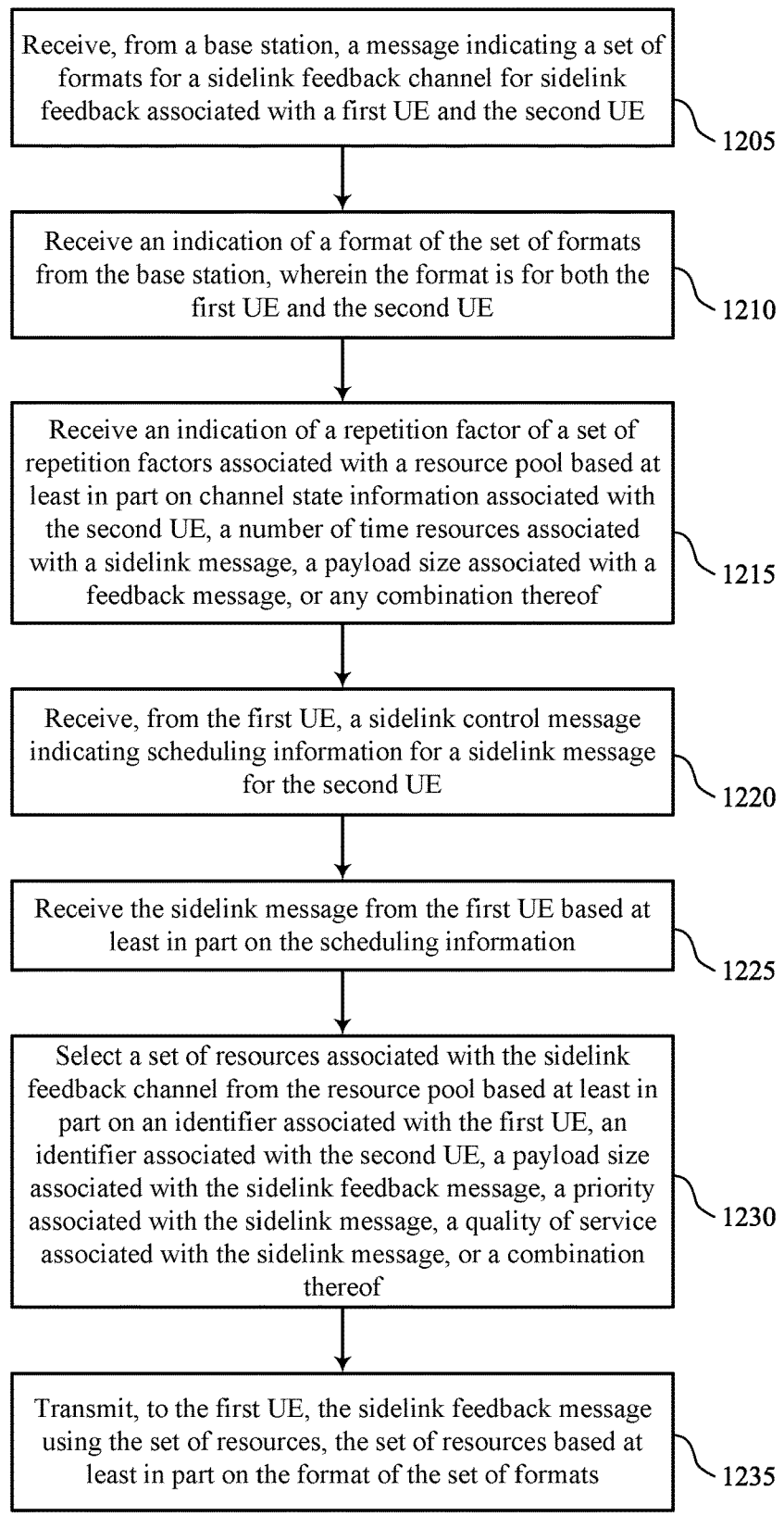

FIG. 12 shows a flowchart illustrating a method 1200 that supports feedback channel design for sidelink feedback in accordance with aspects of the present disclosure. The operations of the method 1200 may be implemented by a UE or its components as described herein. For example, the operations of the method 1200 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1205, the method may include receiving, from a base station, a message indicating a set of formats for a sidelink feedback channel for sidelink feedback associated with a first UE and the second UE. The operations of 1205 may be performed in accordance with examples as disclosed herein. In some examples, aspects of the operations of 1205 may be performed by a format component 725 as described with reference to FIG. 7.

At 1210, the method may include receiving an indication of a format of the set of formats from the base station, where the format is for both the first UE and the second UE. The operations of 1210 may be performed in accordance with examples as disclosed herein. In some examples, aspects of the operations of 1210 may be performed by a format component 725 as described with reference to FIG. 7.

At 1215, the method may include receiving an indication of a repetition factor of a set of repetition factors associated with a resource pool based on CSI associated with the second UE, a number of time resources associated with the sidelink message, a payload size associated with the feedback message, or any combination thereof. The operations of 1215 may be performed in accordance with examples as disclosed herein. In some examples, aspects of the operations of 1215 may be performed by a repetition component 765 as described with reference to FIG. 7.

At 1220, the method may include receiving, from the first UE, a sidelink control message indicating scheduling information for a sidelink message for the second UE. The operations of 1220 may be performed in accordance with examples as disclosed herein. In some examples, aspects of the operations of 1220 may be performed by a scheduling information component 730 as described with reference to FIG. 7.

At 1225, the method may include receiving the sidelink message from the first UE based on the scheduling information. The operations of 1225 may be performed in accordance with examples as disclosed herein. In some examples, aspects of the operations of 1225 may be performed by a sidelink message component 735 as described with reference to FIG. 7.

At 1230, the method may include selecting a set of resources associated with the sidelink feedback channel from the resource pool based on an identifier associated with the first UE, an identifier associated with the second UE, a payload size associated with the sidelink feedback message, a priority associated with the sidelink message, a quality of service associated with the sidelink message, or a combination thereof. The operations of 1230 may be performed in accordance with examples as disclosed herein. In some examples, aspects of the operations of 1230 may be performed by a resource component 755 as described with reference to FIG. 7.

At 1235, the method may include transmitting, to the first UE, the sidelink feedback message using the set of resources based on the format of the set of formats. The operations of 1235 may be performed in accordance with examples as disclosed herein. In some examples, aspects of the operations of 1235 may be performed by a feedback component 740 as described with reference to FIG. 7.

The following provides an overview of aspects of the present disclosure:

Aspect 1: A method for wireless communications at a first UE, comprising: receiving, from a base station, a message indicating a set of formats for a sidelink feedback channel for sidelink feedback associated with the first UE and a second UE; transmitting, to the second UE, a sidelink control message indicating scheduling information for a sidelink message for the second UE: transmitting the sidelink message to the second UE based at least in part on the scheduling information; and monitoring a set of resources associated with the sidelink feedback channel for a sidelink feedback message from the second UE, the set of resources based at least in part on a format of the set of formats for the sidelink feedback channel.

Aspect 2: The method of aspect 1, further comprising: selecting the format from the set of formats, wherein the set of resources corresponds to the format and the set of formats corresponds to a resource pool that includes the set of resources.

Aspect 3: The method of any of aspects 1 through 2, further comprising: transmitting an indication of the format in the sidelink control message based at least in part on the scheduling information for the sidelink message, wherein the scheduling information indicates a number of time resources for the sidelink message.

Aspect 4: The method of any of aspects 1 through 2, further comprising: transmitting an indication of the format in the sidelink control message based at least in part on a CSI trigger associated with the first UE.

Aspect 5: The method of any of aspects 1 through 2, further comprising: transmitting an indication of the format in the sidelink control message, wherein the sidelink control message comprises one of an SCI message, a PC5 message, an RRC message, or a MAC-CE.

Aspect 6: The method of any of aspects 1 through 5, further comprising: receiving an indication of the format from the base station, wherein the format is for both the first UE and the second UE.

Aspect 7: The method of any of aspects 1 through 6, wherein receiving the message indicating the set of formats comprises: receiving an indication of a time domain configuration, a frequency domain configuration, or both corresponding to the format, wherein the time domain configuration, the frequency domain configuration, or both indicate the set of resources.

Aspect 8: The method of any of aspects 1 through 7, wherein the format of the set of formats corresponds to one or more sets of resources for the sidelink feedback channel, each of the one or more sets of resources corresponding to a respective resource identifier.

Aspect 9: The method of aspect 8, wherein each respective resource identifier is associated with a respective payload size for feedback, a respective priority, a respective quality of service, or a combination thereof.

Aspect 10: The method of any of aspects 1 through 9, further comprising: selecting the set of resources based at least in part on an identifier associated with the first UE, an identifier associated with the second UE, or a combination thereof.

Aspect 11: The method of any of aspects 1 through 10, further comprising: receiving, from the base station, an indication of a cover code and a cell-specific sequence for the first UE, wherein the cover code and the cell-specific sequence are associated with a resource pool that includes the set of resources.

Aspect 12: The method of any of aspects 1 through 10, further comprising: receiving, from the base station, an indication of a plurality of cover codes and a plurality of cell-specific sequences for the first UE, wherein the plurality of cover codes and the plurality of cell-specific sequences are associated with a resource pool that includes the set of resources: selecting a cover code from the plurality of cover codes and a cell-specific sequence from the plurality of cell-specific sequences; and transmitting, to the second UE, the cover code and the cell-specific sequence in a control message, wherein the control message comprises one of a sidelink control message, a PC5 message, an RRC message, a MAC-CE.

Aspect 13: The method of any of aspects 1 through 12, further comprising: selecting a cover code based at least in part on a slot index, a mini-slot index, a number of symbols of the sidelink message, an identifier of the first UE, an identifier of the second UE, or any combination thereof.

Aspect 14: The method of any of aspects 1 through 13, further comprising: selecting a repetition factor of a set of repetition factors associated with a resource pool that includes the set of resources based at least in part on CSI associated with the second UE, a number of time resources associated with the sidelink message, a payload size associated with the feedback message, or any combination thereof; and transmitting the repetition factor to the second UE in the sidelink control message.

Aspect 15: The method of aspect 14, wherein the monitoring comprises: receiving one or more instances of the sidelink feedback message from the second UE based at least in part on the repetition factor.

Aspect 16: The method of aspect 15, wherein receiving the one or more instances of the sidelink feedback message comprises: receiving a first instance of the sidelink feedback message and a second instance of the sidelink feedback message based at least in part on a frequency hopping pattern associated with the resource pool.

Aspect 17: The method of aspect 16, further comprising: selecting the frequency hopping pattern from a set of frequency hopping patterns for the resource pool; and transmitting the frequency hopping pattern to the second UE in the sidelink control message, wherein the sidelink control message comprises an SCI message, a PC5 message, an RRC message, a MAC-CE, or any combination thereof.

Aspect 18: The method of any of aspects 1 through 17, further comprising: selecting the set of resources based at least in part on a resource block allocation associated with a resource pool that includes the set of resources.

Aspect 19: The method of aspect 18, further comprising: selecting a bundle size for the sidelink feedback message based at least in part on the resource block allocation or the set of resources.

Aspect 20: The method of aspect 19, further comprising: transmitting an indication of the bundle size in the sidelink control message.

Aspect 21: A method for wireless communications at a second UE, comprising: receiving, from a base station, a message indicating a set of formats for a sidelink feedback channel for sidelink feedback associated with a first UE and the second UE; receiving, from the first UE, a sidelink control message indicating scheduling information for a sidelink message for the second UE; receiving the sidelink message from the first UE based at least in part on the scheduling information; and transmitting, to the first UE, a sidelink feedback message using a set of resources associated with the sidelink feedback channel, the set of resources based at least in part on a format of the set of formats for the sidelink feedback channel.

Aspect 22: The method of aspect 21, further comprising: selecting the format from the set of formats, wherein the set of resources corresponds to the format and the set of formats corresponds to a resource pool that includes the set of resources.

Aspect 23: The method of any of aspects 21 through 22, further comprising: receiving an indication of the format in the sidelink control message based at least in part on the scheduling information for the sidelink message, wherein the scheduling information indicates a number of time resources for the sidelink message.

Aspect 24: The method of any of aspects 21 through 22, further comprising: receiving an indication of the format in the sidelink control message based at least in part on a CSI trigger associated with the first UE.

Aspect 25: The method of any of aspects 21 through 22, further comprising: receiving an indication of the format in the sidelink control message, wherein the sidelink control message comprises one of an SCI message, a PC5 message, an RRC message, or a MAC-CE.

Aspect 26: The method of any of aspects 21 through 22, further comprising: receiving an indication of the format from the base station, wherein the format is for both the first UE and the second UE.

Aspect 27: The method of any of aspects 21 through 26, wherein receiving the message indicating the set of formats comprises: receiving an indication of a time domain configuration, a frequency domain configuration, or both corresponding to the format, wherein the time domain configuration, the frequency domain configuration, or both indicate the set of resources.

Aspect 28: The method of any of aspects 21 through 27, wherein the format of the set of formats corresponds to one or more sets of resources for the sidelink feedback channel, each of the one or more sets of resources corresponding to a respective resource identifier.

Aspect 29: An apparatus for wireless communications at a first UE, comprising a processor: memory coupled with the processor; and instructions stored in the memory and executable by the processor to cause the apparatus to perform a method of any of aspects 1 through 20.

Aspect 30: An apparatus for wireless communications at a first UE, comprising at least one means for performing a method of any of aspects 1 through 20.

Aspect 31: A non-transitory computer-readable medium storing code for wireless communications at a first UE, the code comprising instructions executable by a processor to perform a method of any of aspects 1 through 20.

Aspect 32: An apparatus for wireless communications at a second UE, comprising a processor: memory coupled with the processor; and instructions stored in the memory and executable by the processor to cause the apparatus to perform a method of any of aspects 21 through 28.

Aspect 33: An apparatus for wireless communications at a second UE, comprising at least one means for performing a method of any of aspects 21 through 28.

Aspect 34: A non-transitory computer-readable medium storing code for wireless communications at a second UE, the code comprising instructions executable by a processor to perform a method of any of aspects 21 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a first user equipment (UE), comprising:
   receiving, from a base station, a message indicating a set of formats for a sidelink feedback channel for sidelink feedback associated with the first UE and a second UE;
   transmitting, to the second UE, a sidelink control message indicating scheduling information for a sidelink message for the second UE and indicating a repetition factor associated with a sidelink feedback message;
   transmitting the sidelink message to the second UE based at least in part on the scheduling information; and
   monitoring a set of resources associated with the sidelink feedback channel for one or more instances of the sidelink feedback message from the second UE based at least in part on the repetition factor, the set of resources being selected from a resource pool based at least in part on a format of the set of formats for the sidelink feedback channel.

2. The method of claim 1, further comprising:
   selecting the format from the set of formats, wherein the set of resources corresponds to the format and the set of formats corresponds to the resource pool that includes the set of resources.

3. The method of claim 1, further comprising:
   transmitting an indication of the format in the sidelink control message based at least in part on the scheduling information for the sidelink message, wherein the scheduling information indicates a number of time resources for the sidelink message.

4. The method of claim 1, further comprising:
   transmitting an indication of the format in the sidelink control message based at least in part on a channel state information trigger associated with the first UE.

5. The method of claim 1, further comprising:
   transmitting an indication of the format in the sidelink control message, wherein the sidelink control message comprises one of a sidelink control information message, a PC5 message, a radio resource control message, or a medium access control control element.

6. The method of claim 1, further comprising:
   receiving an indication of the format from the base station, wherein the format is for both the first UE and the second UE.

7. The method of claim 1, wherein receiving the message indicating the set of formats comprises:
   receiving an indication of a time domain configuration, a frequency domain configuration, or both corresponding to the format, wherein the time domain configuration, the frequency domain configuration, or both indicate the set of resources.

8. The method of claim 1, wherein the format of the set of formats corresponds to one or more sets of resources for the sidelink feedback channel, each of the one or more sets of resources corresponding to a respective resource identifier.

9. The method of claim 8, wherein each respective resource identifier is associated with a respective payload size for feedback, a respective priority, a respective quality of service, or a combination thereof.

10. The method of claim 1, further comprising:
selecting the set of resources based at least in part on an identifier associated with the first UE, an identifier associated with the second UE, or a combination thereof.

11. The method of claim 1, further comprising:
receiving, from the base station, an indication of a cover code and a cell-specific sequence for the first UE, wherein the cover code and the cell-specific sequence are associated with the resource pool that includes the set of resources.

12. The method of claim 1, further comprising:
receiving, from the base station, an indication of a plurality of cover codes and a plurality of cell-specific sequences for the first UE, wherein the plurality of cover codes and the plurality of cell-specific sequences are associated with the resource pool that includes the set of resources;
selecting a cover code from the plurality of cover codes and a cell-specific sequence from the plurality of cell-specific sequences; and
transmitting, to the second UE, the cover code and the cell-specific sequence in a control message, wherein the control message comprises one of the sidelink control message, a PC5 message, a radio resource control message, a medium access control control element.

13. The method of claim 1, further comprising:
selecting a cover code based at least in part on a slot index, a mini-slot index, a number of symbols of the sidelink message, an identifier of the first UE, an identifier of the second UE, or any combination thereof.

14. The method of claim 1, further comprising:
selecting the repetition factor of a set of repetition factors associated with the resource pool that includes the set of resources based at least in part on channel state information associated with the second UE, a number of time resources associated with the sidelink message, a payload size associated with the sidelink feedback message, or any combination thereof, wherein transmitting the repetition factor to the second UE is based at least in part on the selecting.

15. The method of claim 14, wherein the monitoring comprises:
receiving the one or more instances of the sidelink feedback message from the second UE based at least in part on the repetition factor.

16. The method of claim 15, wherein receiving the one or more instances of the sidelink feedback message comprises:
receiving a first instance of the sidelink feedback message and a second instance of the sidelink feedback message based at least in part on a frequency hopping pattern associated with the resource pool.

17. The method of claim 16, further comprising:
selecting the frequency hopping pattern from a set of frequency hopping patterns for the resource pool; and
transmitting the frequency hopping pattern to the second UE in the sidelink control message, wherein the sidelink control message comprises a sidelink control information message, a PC5 message, a radio resource control message, a medium access control control element, or any combination thereof.

18. The method of claim 1, further comprising:
selecting the set of resources based at least in part on a resource block allocation associated with the resource pool that includes the set of resources.

19. The method of claim 18, further comprising:
selecting a bundle size for the sidelink feedback message based at least in part on the resource block allocation or the set of resources.

20. The method of claim 19, further comprising:
transmitting an indication of the bundle size in the sidelink control message.

21. A method for wireless communications at a second user equipment (UE), comprising:
receiving, from a base station, a message indicating a set of formats for a sidelink feedback channel for sidelink feedback associated with a first UE and the second UE;
receiving, from the first UE, a sidelink control message indicating scheduling information for a sidelink message for the second UE and indicating a repetition factor associated with a sidelink feedback message;
receiving the sidelink message from the first UE based at least in part on the scheduling information; and
transmitting, to the first UE, one or more instances of the sidelink feedback message using a set of resources associated with the sidelink feedback channel and based at least in part on the repetition factor, the set of resources being selected from a resource pool that is based at least in part on a format of the set of formats for the sidelink feedback channel.

22. The method of claim 21, further comprising:
selecting the format from the set of formats, wherein the set of resources corresponds to the format and the set of formats corresponds to the resource pool that includes the set of resources.

23. The method of claim 21, further comprising:
receiving an indication of the format in the sidelink control message based at least in part on the scheduling information for the sidelink message, wherein the scheduling information indicates a number of time resources for the sidelink message.

24. The method of claim 21, further comprising:
receiving an indication of the format in the sidelink control message based at least in part on a channel state information trigger associated with the first UE.

25. The method of claim 21, further comprising:
receiving an indication of the format in the sidelink control message, wherein the sidelink control message comprises one of a sidelink control information message, a PC5 message, a radio resource control message, or a medium access control control element.

26. The method of claim 21, further comprising:
receiving an indication of the format from the base station, wherein the format is for both the first UE and the second UE.

27. The method of claim 21, wherein receiving the message indicating the set of formats comprises:
receiving an indication of a time domain configuration, a frequency domain configuration, or both corresponding to the format, wherein the time domain configuration, the frequency domain configuration, or both indicate the set of resources.

28. The method of claim 21, wherein the format of the set of formats corresponds to one or more sets of resources for the sidelink feedback channel, each of the one or more sets of resources corresponding to a respective resource identifier.

29. An apparatus for wireless communications at a first user equipment (UE), comprising:
 memory; and
 one or more processors coupled with the memory and configured to cause the first UE to:
  receive, from a base station, a message indicating a set of formats for a sidelink feedback channel for sidelink feedback associated with the first UE and a second UE;
  transmit, to the second UE, a sidelink control message indicating scheduling information for a sidelink message for the second UE and indicating a repetition factor associated with a sidelink feedback message;
  transmit the sidelink message to the second UE based at least in part on the scheduling information; and
  monitor a set of resources associated with the sidelink feedback channel for one or more instances of the sidelink feedback message from the second UE based at least in part on the repetition factor, the set of resources being selected from a resource pool based at least in part on a format of the set of formats for the sidelink feedback channel.

30. An apparatus for wireless communications at a second user equipment (UE), comprising:
 memory; and
 one or more processors coupled with the memory and configured to cause the second UE to:
  receive, from a base station, a message indicating a set of formats for a sidelink feedback channel for sidelink feedback associated with a first UE and the second UE;
  receive, from the first UE, a sidelink control message indicating scheduling information for a sidelink message for the second UE and indicating a repetition factor associated with a sidelink feedback message;
  receive the sidelink message from the first UE based at least in part on the scheduling information; and
  transmit, to the first UE, one or more instances of the sidelink feedback message using a set of resources associated with the sidelink feedback channel and based at least in part on the repetition factor, the set of resources being selected from a resource pool based at least in part on a format of the set of formats for the sidelink feedback channel.

* * * * *